US012755236B2

(12) United States Patent
Steiner et al.

(10) Patent No.: US 12,755,236 B2
(45) Date of Patent: Oct. 6, 2026

(54) AUTOMATED SHELF STOCK MANAGEMENT

(71) Applicant: Toshiba Global Commerce Solutions, Inc., Durham, NC (US)

(72) Inventors: David Steiner, Durham, NC (US); Craig Compton, Wake Forest, NC (US); Daniel Hunt, Wake Forest, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 434 days.

(21) Appl. No.: 18/371,597

(22) Filed: Sep. 22, 2023

(65) Prior Publication Data

US 2025/0104008 A1 Mar. 27, 2025

(51) Int. Cl.
*G06Q 10/087* (2023.01)
*G06K 7/14* (2006.01)

(52) U.S. Cl.
CPC ......... *G06Q 10/087* (2013.01); *G06K 7/1408* (2013.01); *G06K 7/1443* (2013.01); *G06Q 10/08724* (2025.08)

(58) Field of Classification Search
CPC ........... G06Q 10/087; G06Q 10/08724; G06K 7/1408; G06K 7/1443
See application file for complete search history.

(56) References Cited

U.S. PATENT DOCUMENTS

2012/0216954 A1 8/2012 Park et al.
2016/0328767 A1* 11/2016 Bonner .............. G06K 7/10861
2018/0025412 A1 1/2018 Chaubard
2019/0258871 A1* 8/2019 Jones ..................... G01G 23/18
2022/0067636 A1* 3/2022 Shearin .................. H04N 7/188

FOREIGN PATENT DOCUMENTS

WO WO-2020051407 A1 * 3/2020 ............... G09G 3/32

OTHER PUBLICATIONS

Captana ShelfEye—The camera for automated shelf monitoring; https://www.e-shelf-labels.com/hardware/captana-shelfeye.html.
Upgrade to a Self-Driving Store with focalOS; https://focal.systems/.

* cited by examiner

*Primary Examiner* — Justin Holmes
(74) *Attorney, Agent, or Firm* — Kaufman & Canoles, P.C.

(57) ABSTRACT

Systems and methods of performing automated shelf stock management are provided. In one exemplary embodiment, a method is performed by a first network node operationally coupled to an optical sensor device having a field of view towards a shelf structure having a set of stocked items and operable to capture an image of the shelf structure. Further, the first network node is operationally coupled to a set of display devices disposed on the shelf structure with each display device being specific to and proximate a certain stocked item on the shelf structure and operable to display stocked item information. The method includes obtaining information associated with a current arrangement of the stocked items and the corresponding display devices on the shelf structure so as to determine whether the stocked item information of a certain stocked item is associated with the stocked item information displayed by the corresponding display device.

17 Claims, 15 Drawing Sheets

400e

AUTOMATED SHELF STOCK MANAGEMENT

BACKGROUND

Retail stores offer stocked items (e.g., retail items) for sale along aisles of shelves in which consumers can browse stocked items on those shelves. As consumers take stocked items off the shelves, the retail store continually restocks stocked items as consumers purchase them. Further, certain stocked items may need to be restocked more often than other stocked items. The retail store management can require store clerks to traverse the aisles to identify those stocked items on the shelves to be restocked. This approach requires significant time and cost spent by store clerks in restocking during the operation of the retail store. While the retail store management can reduce the amount of time and cost store clerks spend restocking, this decision may result in the retail store having more frequent out-of-stock stocked items for longer durations.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1A:
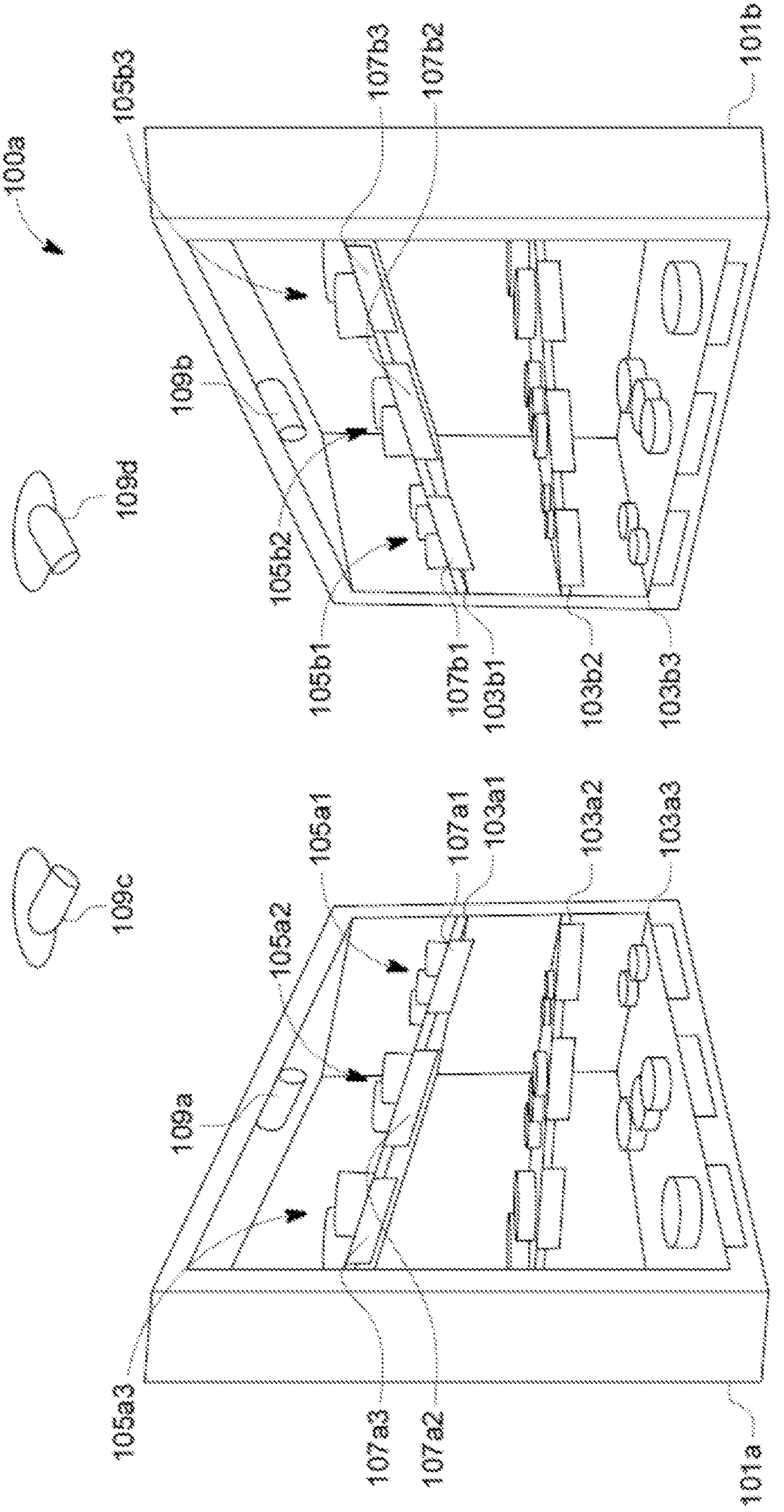
FIGS. 1A-B illustrate one embodiment of a system operable to perform automated shelf restocking in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Electronic shelf label (ESL) display devices can be positioned on retail shelves such as on a front edge of a shelf and can be configured by retailors to display the price of stocked items, which can be automatically updated or changed under the control of a server. ESL display devices can include, for instance, electronic paper (E-paper) or liquid-crystal display (LCD) technology to display the current prices of the corresponding stocked items to the consumer. E-paper technology is widely used on ESL display devices as E-paper technology provides a clearly visible display and supports full graphic images while consuming power predominantly during display updates, with little to no power needed to retain the displayed image.

Furthermore, ESL display devices can reduce carbon footprint waste in retail stores by no longer requiring the replacement of paper shelf labels due to price or inventory changes and can enable real-time product price updates instead of requiring store clerks to manually replace paper shelf labels. A server can be configured to automatically update the displayed price on an ESL display device whenever the price of the corresponding stocked item is changed—in contrast to static placards (e.g., paper shelf labels) that require a manual process to prepare and install. When stocking shelves, store clerks can follow a planogram. In one definition, a planogram provides specific positions, locations or arrangements of each stocked item on the shelves of a shelf structure. In another definition, a planogram is a diagram or model that indicates the position, placement or arrangement of stocked items on the shelves of a shelf structure. The store clerks can also manually place, transfer, or move ESL display devices as they restock and adjust inventory on the retail shelves. However, this manual process can result in ESL display devices being incorrectly placed or moved or improperly configured to represent new or changed shelf inventory. Accordingly, there is a need for improved techniques to perform automated shelf stock management using ESL display devices. In addition, other desirable features and characteristics of the present disclosure will become apparent from the subsequent detailed description and embodiments, taken in conjunction with the accompanying figures and the foregoing technical field and background.

In one exemplary embodiment, an optical sensor device (e.g., scanner, camera) can be configured to monitor shelf inventory and identify issues with shelf inventory locations and adjustments. Further, the optical sensor device can be configured to conduct the initial setup of a set of display devices (e.g., ESL display devices) positioned on the shelves by scanning or capturing a visual unique identifier code (e.g., barcode, QR code) displayed by each display device. In one example, the optical sensor device can scan and decode the visual unique identifier code displayed on the display device to obtain a unique identifier of that display device. In another example, the optical sensor device can capture image data of a captured image of the visual unique identifier code displayed on the display device. The optical sensor device can then decode the visual unique identifier code based on the image data to obtain the unique identifier of the display device. In yet another example, the optical sensor device can send the image data to a server where the server is configured to decode the visual unique identifier code based on the image data to obtain the unique identifier of the display device. The unique identifier can then be associated with the certain display device and the corresponding stocked item. The server can be configured to also associate the stocked item with the display device, enabling the server to push price updates for specific stocked items to the corresponding display devices for display of the updated prices.

In another exemplary embodiment, a system includes optical sensor devices (e.g., scanner, camera) to perform shelf monitoring and a set of display devices (e.g., ESL display devices). The system can be configured to output, to a certain display device for display, stocked item information (e.g., price, product, UPC, stock number) associated with a corresponding stocked item proximate the certain display device. Further, the system can update the displayed stocked item information on the certain display device and determine to restock the corresponding stocked item based on that stocked item having low quantities or being out-of-stock on the shelves. The system can also enable store clerks to restock shelves based on product availability without requiring a planogram by placing and configuring a display device proximate a corresponding stocked item. Furthermore, the system can adjust the price of a stocked item displayed by the corresponding display device.

In another exemplary embodiment, an optical sensor device (e.g., closed circuit camera device) can monitor shelf inventory and identify stocked items on shelves within the field of view of the optical sensor device. In addition, the optical sensor device can identify display devices and their corresponding stocked items, as well as the content displayed by each display device. During initial configuration of the display devices on a shelf structure having shelves, a first network node (e.g., server) operationally coupled to the display devices over a network (e.g., Ethernet, WiFi, Internet, LAN) can send, to each display device, an indication that includes a request to display a visual unique identifier code (e.g., barcode, QR code). Each display devices can be configured to use wireless communications (e.g., WiFi, Bluetooth, LoRa), wired communications (e.g., ethernet, USB), infrared communications, optical communications, or the like to communicate with a server. The selection of a particular wireless communication technology can be based on wireless range, speed, battery life, reliability, or the like. In response, each display device can output for display a certain visual unique identifier code of that display device. The first network node can then obtain the current arrangement information associated with the display devices and their corresponding stocked items on the shelves of the shelf structure. The current arrangement information can include the unique identifier of each display device, the position, location or arrangement of each display device on the shelves of the shelf structure, stocked item information (e.g., price, product, UPC, stock number) of each stocked item, the position, location or arrangement of each stocked item on the shelves of the shelf structure, the number of items stocked for each stocked item on the shelves of the shelf structure, or the like. The first network node can then associate each display device to the corresponding position, location or arrangement on the shelves and the corresponding stocked item proximate that display device. Further, the first network node can generate or update a planogram of the shelf structure based on the position, location or arrangement of each stocked item on the shelves of the shelf structure.

In another exemplary embodiment, during configuration of one or more display devices on the shelf structure, the first network node can send, to each display device, an indication that includes a request to display a visual unique identifier code of that display device. In response, each display device can output for display a certain visual unique identifier code of that display device. The first network node can then obtain the current arrangement information associated with the display devices and their corresponding stocked items on the shelves of the shelf structure. The first network node can then associate each display device to the corresponding position, location or arrangement on the shelves and the corresponding stocked item proximate that display device. Further, the first network node can update a current planogram of the shelf structure based on the position, location or arrangement of each stocked item on the shelves of the shelf structure.

Figure 1B:
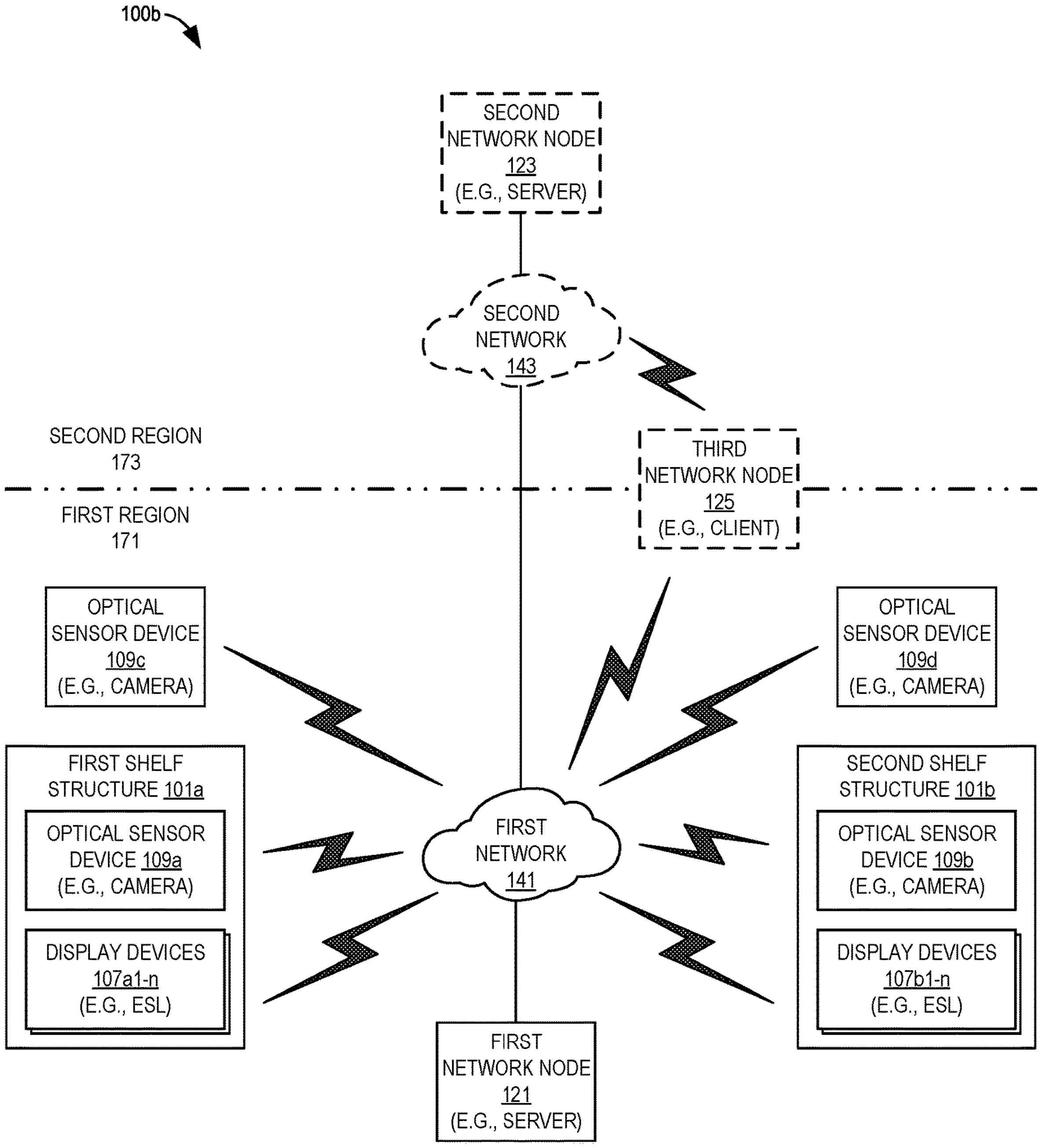

FIGS. 1A-B illustrate one embodiment of a system 100*a-b* operable to perform automated stock shelf management in accordance with various aspects as described herein. As shown in FIGS. 1A-B, the system 100*a,b* can include a first network node 121 (e.g., server) associated with a first region 171 (e.g., retail store, shelf structure) and communicatively coupled over a first network 141 (e.g., Ethernet, WiFi, LAN) and a second network 143 (e.g., WAN, Internet) to a second network node 123 (e.g., server) associated with a second region 173 (e.g., set of retail stores, geographical region) that includes the first region 171. In one example, the first region 171 is associated with a certain retail store and the second region 173 is associated with a set of retail stores that includes the certain retail store. In another example, the first region 171 is associated with a certain shelf structure and the second region 173 is associated with a retail store that includes the certain shelf structure. In yet another example, the first region 171 is associated with a certain retail store and the second region 173 is associated with a set of retail stores (including the certain retail store) in a certain geographical region (e.g., Southeast United States). Each shelf structure 101*a,b* includes shelves 103*a*1-3, 103*b*1-3 with each shelf 103*a*1-3, 103*b*1-3 having a portion of a set of stocked items (including stocked items 105*a*1-3, 105*b*1-3) with any of the same stocked items 105*a*1-3, 105*b*1-3 being transversely arranged on that shelf 103*a*1-3, 103*b*1-3.

Furthermore, the first network node 121 can be communicatively coupled over the first network 141 in the first region 171 to a set of display devices 107*a*1-*n* (e.g., ESL display devices) of a first shelf structure 101*a* and a set of display devices 107*b*1-*n* (e.g., ESL display devices) of a second shelf structure 101*b* as well as to optical sensor devices 109*a-d* (e.g., scanner, camera). Each optical sensor device 109*a,b* can be disposed on the corresponding shelf structure 101*a,b*. In one example, each optical sensor device 109*a,b* can be mounted at the edge of a certain shelf of the corresponding shelf structure 109*a,b*. In another example, each optical sensor device 109*a,b* can be mounted on the corresponding shelf structure 109*a,b* that is about four to five feet above the bottom of the corresponding shelf structure 109*a,b*. The first shelf structure 101*a* can be positioned opposite to or offset from the second shelf structure 101*b* so that the optical sensor device 109*a* disposed on the first shelf structure 101*a* can be configured with a field of view towards the shelves 103*b*1-3 of the second shelf structure 101*b*. Similarly, the second shelf structure 101*b* can be positioned opposite to or offset from the first shelf structure 101*a* so that the optical sensor device 109*b* disposed on the second shelf structure 101*b* can be configured with a field of view towards the shelves 103*a*1-3 of the first shelf structure 101*a*.

Alternatively or additionally, the optical sensor devices 109*c,d* can replace or be configured to contemporaneously capture images at different viewing angles of the corresponding optical sensor devices 109*a,b* of the first and second shelf structures 101*a,b*. For instance, the first network node 121 can be configured to receive image data of images contemporaneously captured at different viewing angles by each optical sensor device 109*a,c* of the shelf structure 101*b*. The first network node 121 can then determine the current arrangement information of the stocked items 105*b*1-*n* and the corresponding display devices 107*b*1-*n* on the shelves 103*b*1-3 of the shelf structure 101*b* based on the captured images by the optical sensor devices 109*a,c*. Further, the optical sensor devices 109*c,d* can be disposed on a wall, ceiling, or vertical structure. The optical sensor device 109*c* can be configured with a field of view towards the shelves 103*b*1-3 of the second shelf structure 101*b*. Similarly, the optical sensor device 109*d* can be configured with a field of view towards the shelves 103*a*1-3 of the first shelf structure 101*a*.

In FIGS. 1A-B, each display device 107*a*1-*an*, 107*b*1-*n* can be configured to display information such as stocked item information (e.g., price) in visual form on a display element such as electronic paper (E-paper), liquid-crystal display (LCD), a light emitting diode (LED) display, or the like. In one example, each display device 107*a*1-*n*, 107*b*1-*n* can be configured as a small form factor (e.g., 3" to 10" wide by 2" to 5" high), battery-powered display that displays product or pricing information at the shelf edge of the shelf structure 101*a,b*. Further, each display device 107*a*1-*n*, 107*b*1-*n* can be configured to use wireless technology (e.g., WiFi, Bluetooth, LoRa) to communicate with the first network node 121 over the network 141. The stocked item information can include a visual unique identifier code (e.g., barcode, QR code), product price, stock identifier, product name, product image, the like, or any combination thereof. The visual unique identifier code 153 can represent one of the set of unique identifiers (e.g., UPCs), with each identifier being specific to a certain stocked item and represented by a series of characters (e.g., numeric characters, alphabetic characters, alphanumeric characters). Universal Product Code (UPC), which can refer to UPC-A, can include a sequence of twelve characters (e.g., 12 numeric characters) that are uniquely assigned to each stocked item. Along with the related International Article Number (EAN) barcode, the UPC is the barcode mainly used for scanning of stocked items at the point of sale, per the specifications of the international GS1 organization. In one example, a UPC-A barcode can be a sequence of twelve characters (e.g., 12 digits), which can be made up of four sections: a number system character, a five-character manufacturing number, a five-character item number and a check character.

In the current embodiment, each optical sensor device 109*a*-*d* can include an image scanner or camera. An image scanner can be operable to optically scan images or printed text or objects and convert them to a digital image. A camera can be operable to capture an image Further, a camera can be configured to be low, mid or high resolution, narrow or wide angle, fixed focus or autofocus, or the like depending on the specific application. In one example, each optical sensor device 109*a*-*d* can include a high resolution, wide angle, autofocus camera.

Figure 1C:
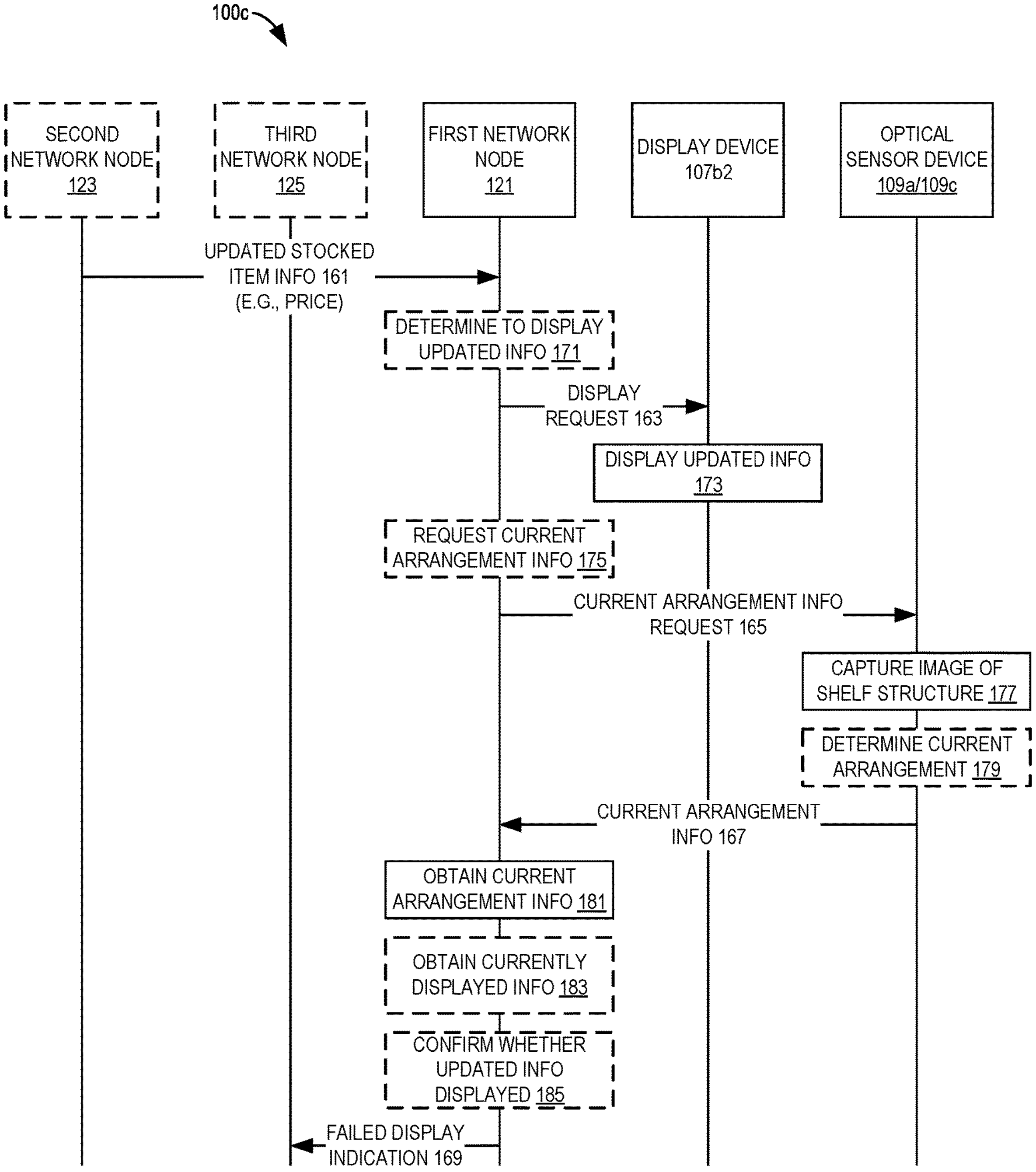
FIG. 1C is a signal flow diagram illustrating one embodiment of certain signal flows of the system of FIGS. 1A-B.

FIG. 1C is a signal flow diagram 100*c* illustrating one embodiment of certain signal flows of the system 100*a*-*b* of FIGS. 1A-B. In FIG. 1C, the second network node 123 (e.g., server) can send, to the first network node 121 (e.g., server) over the second network 143 (e.g., Internet, WAN), an indication 161 that includes updated stocked item information (e.g., price) of a certain stocked item 105*b*1-*n* on the shelf structure 101*b*. The first network node 121 can receive this indication 161 to obtain the updated stocked item information of the certain stocked item 105*b*1-*n* on the shelf structure 101*b*. The first network node 121 can then determine to display the updated stocked item information of the certain stocked item 105*b*1-*n* on the display of the corresponding display device 107*b*1-*n*, as represented by block 171. In response, the first network node 121 can send, to the corresponding display device 107*b*1-*n* over the first network 141 (e.g., WiFi, Bluetooth, LoRa, ethernet, LAN), an indication 163 that includes a request to display the updated stocked item information of the certain stocked item 105*b*1-*n* on the shelf structure 101*b* and that updated stocked item information. The display device 107*b*1-*n* can receive the request indication 163 and in response, can display the updated stocked item information of the certain stocked item 105*b*1-*n* on the shelf structure 101*b*, as represented by block 173.

In FIG. 1C, the first network node 121 can also determine to request the current arrangement information of the shelf structure 101*b*, as represented by block 175. In response, the first network node 121 can send, to the optical sensor device 109*a,c* over the network 141, an indication 165 that includes a request for the current arrangement information of the shelf structure 101*b*. The optical sensor device 109*a,c* can receive the request indication 165 and in response, can obtain image data of a captured image of the shelf structure 101*b*, as represented by block 177. The optical sensor device 109*a,c* can then determine the current arrangement information of the shelf structure 101*b* based on the image data, as represented by block 179. The optical sensor device 109*a,c* can then send, to the first network node 121 over the first network 141, an indication 167 that includes the current arrangement information of the shelf structure 101*b*. The first network node 121 can receive the indication 167 and in response, can obtain the current arrangement information of the shelf structure 101*b* based on the indication 167, as represented by block 181. The first network node 121 can then obtain the stocked item information currently displayed by the corresponding display device 107*b*1-*n* based on the current arrangement information of the shelf structure 101*b*, as represented by block 183. The first network node 121 can also determine that the stocked item information currently displayed by the corresponding display device 107*b*1-*n* is different from the updated stocked item information of the certain stocked item 105*b*1-*n*, as represented by block 185. In response, the first network node 121 can send, to the third network node 125 over the first or second network 141, 143, an indication 169 that the corresponding display device 107*b*1-*n* failed to display the updated stocked item information. The third network node 125 can then output, for display, a visual representation associated with the failure of the corresponding display device 107*b*1-*n* to display the updated stocked item information of the certain stocked item 105*b*1-*n*. The third network node 125 can be a wireless device (e.g., smartphone, cellular phone, tablet), computer terminal device, server, or the like. Further, the third network node 125 can be coupled to the first network node 121 over the first or second network 141, 143. In one example, the third network node 125 is a computer terminal device in the first region 171 and communicatively coupled to the first network node 121 over the first network 141. In another example, the third network node 125 is a smartphone in the second region 173 and communicatively coupled to the first network node 121 over the first and second networks 141, 143. Additionally or alternatively, the first network node 121 can send a text message or email message to enable a store clerk to be alerted to the failure of the corresponding display device 107*b*1-*n* to display the updated stocked item information of the certain stocked item 105*b*1-*n*.

In another exemplary embodiment, the first network node 121 can determine that the corresponding display device 107*b*1-*n* is inoperable such as by determining that no text or no objects are currently displayed on the display of that corresponding display device 107*b*1-*n* when text or objects are expected to be displayed. In response, the first network node 121 can send, to the third network node 125 over the first or second network 141, 143, an indication that the corresponding display device 107*b*1-*n* is or may be inoperable.

In another exemplary embodiment, after initial configuration of the set of display devices 107*b*1-*n*, the first network node 121 can determine the current arrangement information of the shelf structure 101*b*, including the stocked item information and the position, location or arrangement of each stocked item 105*b*1-*n* and the corresponding display device 107*b*1-*n* on the shelves 103*b*1-3 of the shelf structure 101*b*. The first network node 121 can confirm that the stocked item information of each stocked item 105*b*1-*n* is associated with the stocked item information of the corresponding display device 107*b*1-*n*.

In another exemplary embodiment, the first network node 121 can determine that the stocked item information of a certain stocked item 105*b*1-*n* is unassociated with the stocked item information currently displayed by the corresponding display device 107*b*1-*n* based on the current arrangement information of the shelf structure 101*b*. In response, the first network node 121 can obtain the stocked item information of the certain stocked item 105*b*1-*n* for display on the corresponding display device 107*b*1-*n*. The first network node 121 can then send, to the corresponding display device 107*b*1-*n*, an indication that includes the stocked item information of the certain stocked item 105*b*1-*n* for display on the corresponding display device 107*b*1-*n*.

In another exemplary embodiment, the first network node 121 can obtain the stocked item information of a certain stocked item 105*b*1-*n* expected to be displayed by a corresponding display device 107*b*1-*n* of the shelf structure 101*b*. The first network node 121 can send, to the corresponding display device 107*b*1-*n*, an indication that includes a request to display the expected stocked item information. The first network node 121 can then obtain the current arrangement information of the shelf structure 101*b*. Further, the first network node 121 can obtain the stocked item information currently displayed by the corresponding display device 107*b*1-*n* based on the current arrangement information of the shelf structure 101*b*. The first network node 121 can then determine that the expected stocked item information is different from the current stocked item information. The first network node 121 can then send, to a third network node 125 over the first or second network 141, 143, an indication associated with the stocked item information of the certain stocked item 105*b*1-*n* being improperly displayed on the corresponding display device 107*b*1-*n*. In addition, the first network node 121 can determine that the corresponding display device 107*b*1-*n* is inoperable based on the current and expected stocked item information. For instance, the first network node 121 can determine that the corresponding display device 107*b*1-*n* is inoperable responsive to determining that the expected stocked item information is different from the current stocked item information or represents a blank display. In response, the first network node 121 can send, to the third network node 125 over the first or second network 141, 143, an indication that the corresponding display device is inoperable.

In another exemplary embodiment, the features, benefits and/or functions described herein may be implemented by the first network node 121 or the optical display device 109*a-d* or partitioned between the first network node 121 and the optical display device 109*a-d*.

In another exemplary embodiment, the first network node 121 and the optical sensor device 109*a-d* are the same device.

In another embodiment, the first network node 121 can determine when each of the same stocked item 105*b*1-*n* on the shelf 103*b*1-3 of the shelf structure 101*b* is added or removed from that shelf 103*b*1-3 based on the current arrangement information of the stocked items 105*b*1-*n* on the shelves 103*b*1-3 of the shelf structure 101*b*. In response, the first network node 121 can determine the number of items stocked on the shelf 103*b*1-3 of the shelf structure 101*b* for that stocked item 105*b*1-*n*. Further, the first network node 121 can send, to the corresponding display device 107*b*1-*n* for display, an indication that includes a visual representation of the number of items stocked on the shelf.

In another embodiment, the first network node 121 can determine when a stocked item 105*b*1-*n* on the shelf 103*b*1-3 of the shelf structure 101*b* is out of stock based on the current arrangement information of the stocked items 105*b*1-*n* on the shelves 103*b*1-3 of the shelf structure 101*b*. In response, the first network node 121 can obtain a visual stocked item order code (e.g., barcode, QR code) associated with information to enable ordering the stocked item such as a uniform resource locator (URL) to a website from which the stocked item can be ordered online. Further, the first network node 121 can send, to the corresponding display device 107*b*1-*n* for display, an indication that includes the visual stocked item order code. Once displayed on the corresponding display device 107*b*1-*n*, the visual stocked item order code can be scanned by a camera of a wireless device (e.g., smartphone, tablet) to obtain the stocked item order information.

In another embodiment, the first network node 121 can determine when each of the same stocked item 105*b*1-*n* is placed on or removed from the shelf 103*b*1-3 of the shelf structure 101*b* based on the current arrangement information of the stocked items 105*b*1-*n* on the shelves 103*b*1-3 of the shelf structure 101*b*. In response, the first network node 121 can determine the number of items stocked on the shelf 103*b*1-3 of the shelf structure 101*b* for that stocked item 105*b*1-*n*. Further, the first network node 121 can send, to the corresponding display device 107*b*1-*n* for display, an indication that includes a visual representation of the number of items stocked on the shelf 103*b*1-3 of the shelf structure 101*b* for that stocked item 105*b*1-*n*.

FIGS. 2A-E illustrate other embodiments of a network node device 200*a-e* in accordance with various aspects as described herein. In FIGS. 2A-E, the device 200*a-e* implements various functional means, units, or modules (e.g., via the processing circuitry 301*a* in FIG. 3A, via the processing circuitry 501 in FIG. 5, via software code, or the like), or circuits. In one embodiment, these functional means, units, modules, or circuits (e.g., for implementing the method(s) described herein) may include for instance: an arrangement obtain circuit 201*a* operable to obtain information associated with a current arrangement of stocked items and corresponding display devices on a shelf structure; an arrangement obtain determination circuit 203*a* operable to determine to obtain arrangement information of a shelf structure; a send circuit 205*a* operable to send information; a receive circuit 207*a* operable to receive information; a stocked item confirmation circuit 211 operable to confirm whether the stocked item information of a certain stocked item on a shelf structure is associated with the stocked item information displayed by a corresponding display device; a current stocked item obtain circuit 213*a* operable to obtain the stocked item information currently displayed by a corresponding display device based on arrangement information of a shelf structure; a display device information obtain circuit 215*a* operable to obtain the stocked item information of a certain stocked item on a shelf structure based on arrangement information of that shelf structure; a stocked item confirmation circuit 217*a* operable to determine that the stocked item information of a certain stocked item is different from the stocked item information currently displayed by a corresponding display device; and/or a stocked item information obtain circuit 221*a* operable to obtain the stocked item information of a certain stocked item for display by a corresponding display device.

Figure 2A:
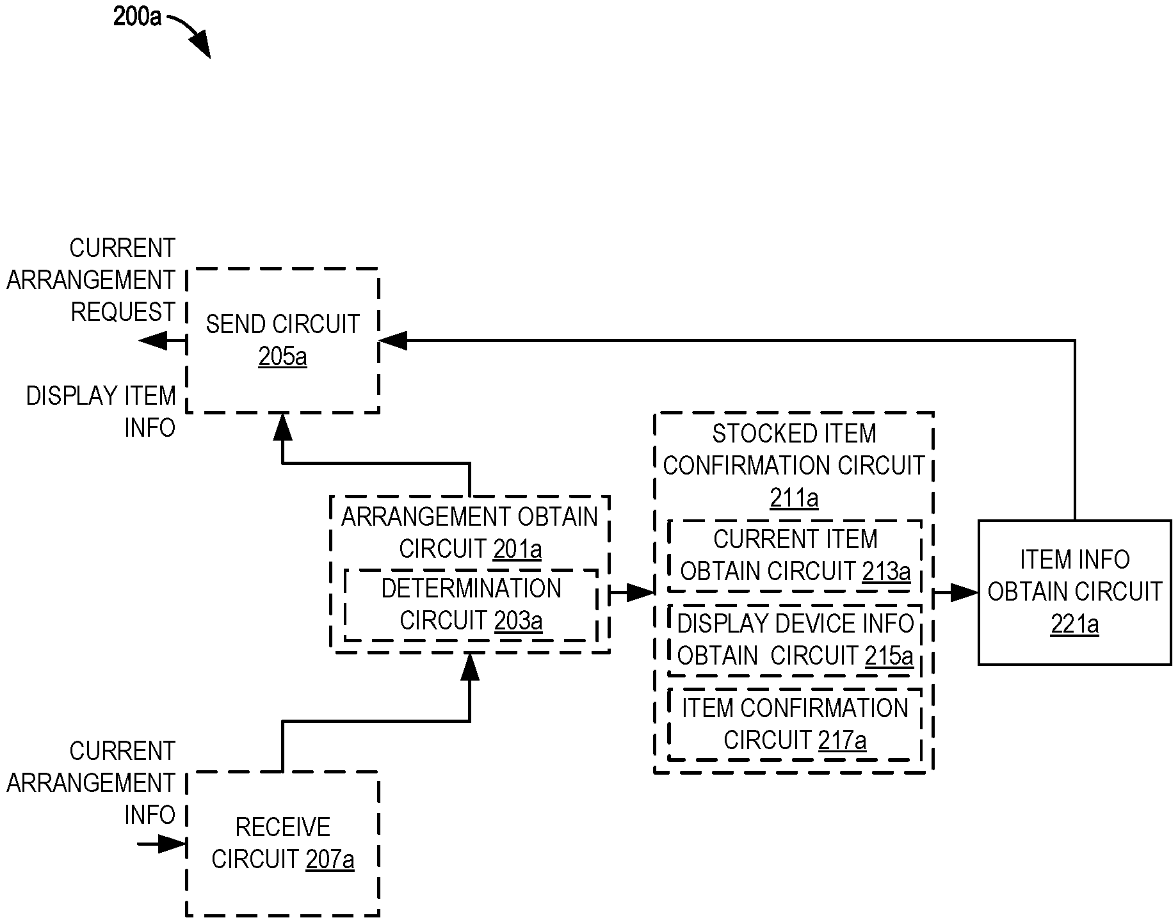
FIGS. 2A-2E illustrate embodiments of a network node device in accordance with various aspects as described herein.
Figure 2B:
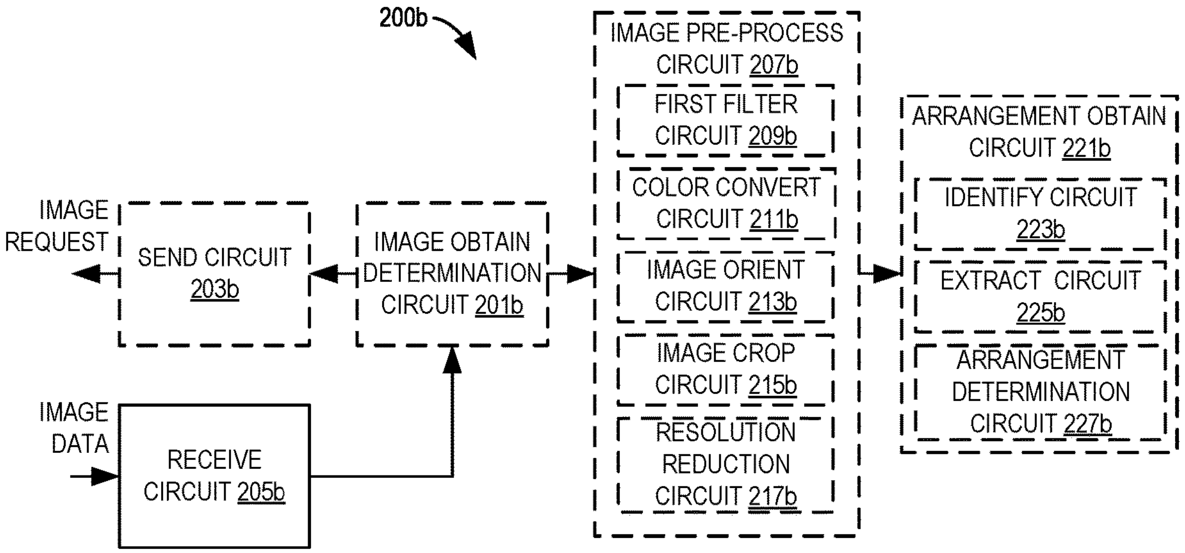

In FIG. 2B, in another embodiment, these functional means, units, modules, or circuits (e.g., for implementing the method(s) described herein) may include for instance: an image obtain determination circuit 201*b* operable to determine to obtain an image of a shelf structure; a send circuit 203*b* operable to send information; a receive circuit 205*b* operable to receive information; an image pre-process circuit 207*b* operable to pre-process image data; a first filter circuit 209*b* operable to apply a first filter on image data such as to reduce noise or artifacts; a color convert or correct circuit 211*b* operable to convert a color image to a grayscale image or to perform color correction of a color image based on image data; an image orient circuit 213*b* operable to orient an image based on image data; an image crop circuit 215*b* operable to crop an image based on image data; a resolution reduction circuit 217*b* operable to reduce a resolution of an image based on image data; an arrangement obtain circuit 221*b* operable to obtain arrangement information of a shelf structure based on image data; an identify circuit 223*b* operable to identify presences/locations of text/objects associated with stocked items and corresponding display devices on a shelf structure based on image data; an extract circuit 225*b* operable to extract text/objects associated with stocked items and corresponding display devices based on image data of an image and identified locations of text/objects in that image; and/or an arrangement determination circuit 227*b* operable to determine arrangement information of stocked items and corresponding display devices on a shelf structure based on extracted text/objects of those stocked items and the corresponding display devices from an image and the identified locations of the extracted text/objects in that image. A skilled artisan will readily recognize techniques for extracting text and objects from images. For instance, text can be extracted from images using optical character recognition (OCR). Further, OCR can use machine learning algorithms to identify the presence, layout or arrangement of text in an image. The process of extracting text from an image can include identifying regions in the image where text is present and converting the identified regions in the image where text is present into raw text.

Figure 2C:
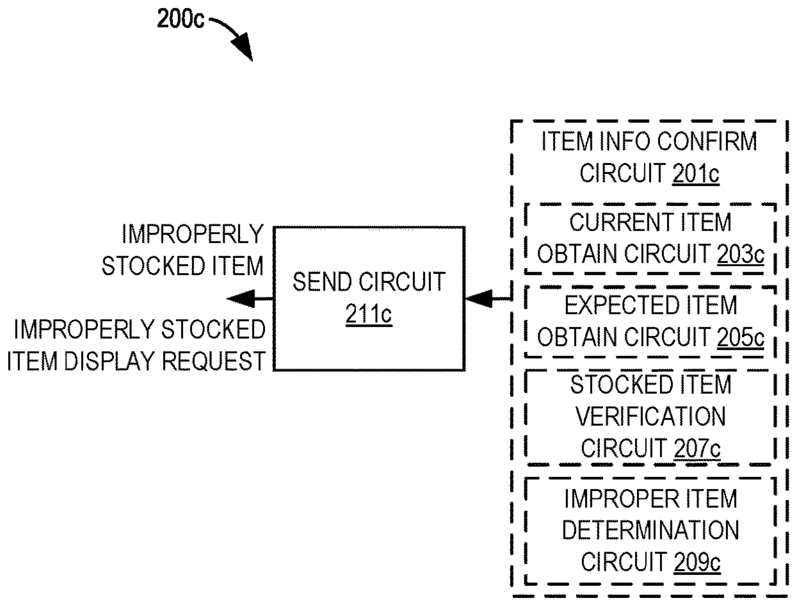

In FIG. 2C, in another embodiment, these functional means, units, modules, or circuits (e.g., for implementing the method(s) described herein) may include for instance: a stocked item information confirmation circuit 201*c* operable to confirm whether the stocked item information of a currently stocked item at a certain position, location or arrangement on a shelf structure corresponds to the stocked item information of a stocked item expected at that certain position, location or arrangement; a current stocked item obtain circuit 203*c* operable to obtain the stocked item information of a current stocked item at a certain position, location or arrangement on a shelf structure based on current arrangement information of that shelf structure; an expected stocked item obtain circuit 205*c* operable to obtain the stocked item information of a stocked item expected to be at a certain position, location or arrangement on a shelf structure; a current/expected stocked item verification circuit 207*c* operable to verify whether the stocked item information of a current stocked item corresponds to the stocked item information of an expected stocked item at a certain position, location or arrangement on a shelf structure; an improperly stocked item determination circuit 209*c* operable to determine that a current stocked item is an improperly stocked item; and/or a send circuit 211*c* operable to send information.

Figure 2D:
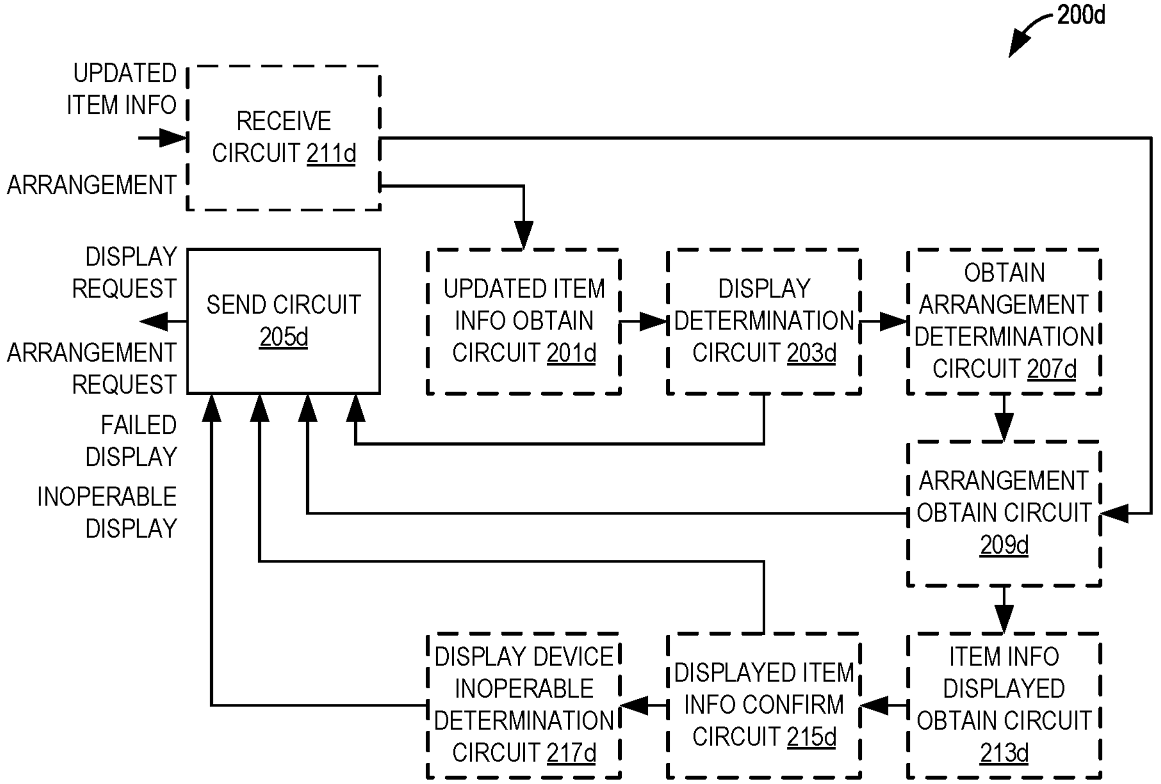

In FIG. 2D, in another embodiment, these functional means, units, modules, or circuits (e.g., for implementing the method(s) described herein) may include for instance: an updated stocked item information obtain circuit 201*d* operable to obtain updated stocked item information of a certain stocked item on a shelf structure; a stocked item information display determination circuit 203*d* operable to determine to display updated stocked item information of a certain stocked item of a shelf structure on a display of a corresponding display device; a send circuit 205*d* operable to send information; an obtain arrangement determination circuit 207*d* operable to determine to obtain arrangement information of a shelf structure; an arrangement obtain circuit 209*d* operable to obtain arrangement information of stocked items and corresponding display devices of a shelf structure; a receive circuit 211*d* operable to receive information; a displayed stocked item obtain circuit 213*d* operable to obtain the stocked item information currently displayed by a certain display device based on current arrangement information of a shelf structure; a displayed stocked item information confirmation circuit 215*d* operable to determine whether the stocked item information currently displayed by a corresponding display device corresponds to the updated stocked item information expected to be displayed on that display device; and/or a display device inoperable determination circuit 217*d* operable to determine whether the corresponding display device is inoperable.

Figure 2E:
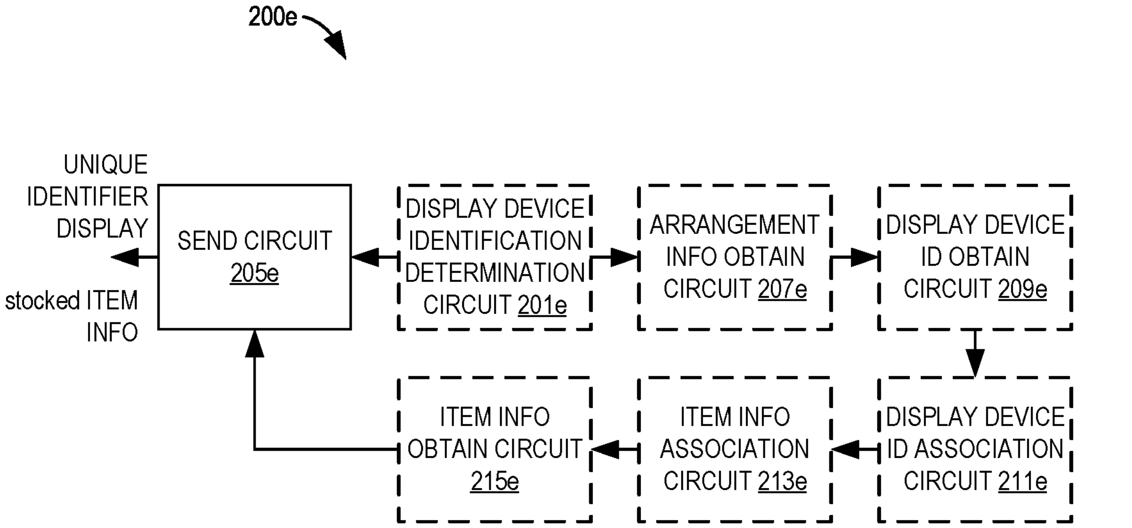

In FIG. 2E, in another embodiment, these functional means, units, modules, or circuits (e.g., for implementing the method(s) described herein) may include for instance: a display device identification determination circuit 201*e* operable to determine to identify a certain display device on a shelf structure; a send circuit 205*e* operable to send information; an arrangement information obtain circuit 207*e* operable to obtain arrangement information of a shelf structure; a display device identifier obtain circuit 211*b* operable to obtain a unique identifier of a certain display device; a display device identifier association circuit 211*e* operable to associate a unique identifier with a certain display device; a stocked item information association circuit 213*e* operable to associate a certain display device with a corresponding stocked item; and/or a stocked item information obtain circuit 215*e* operable to obtain stocked item information for display on a certain display device based on a corresponding stocked item.

Figure 2F:
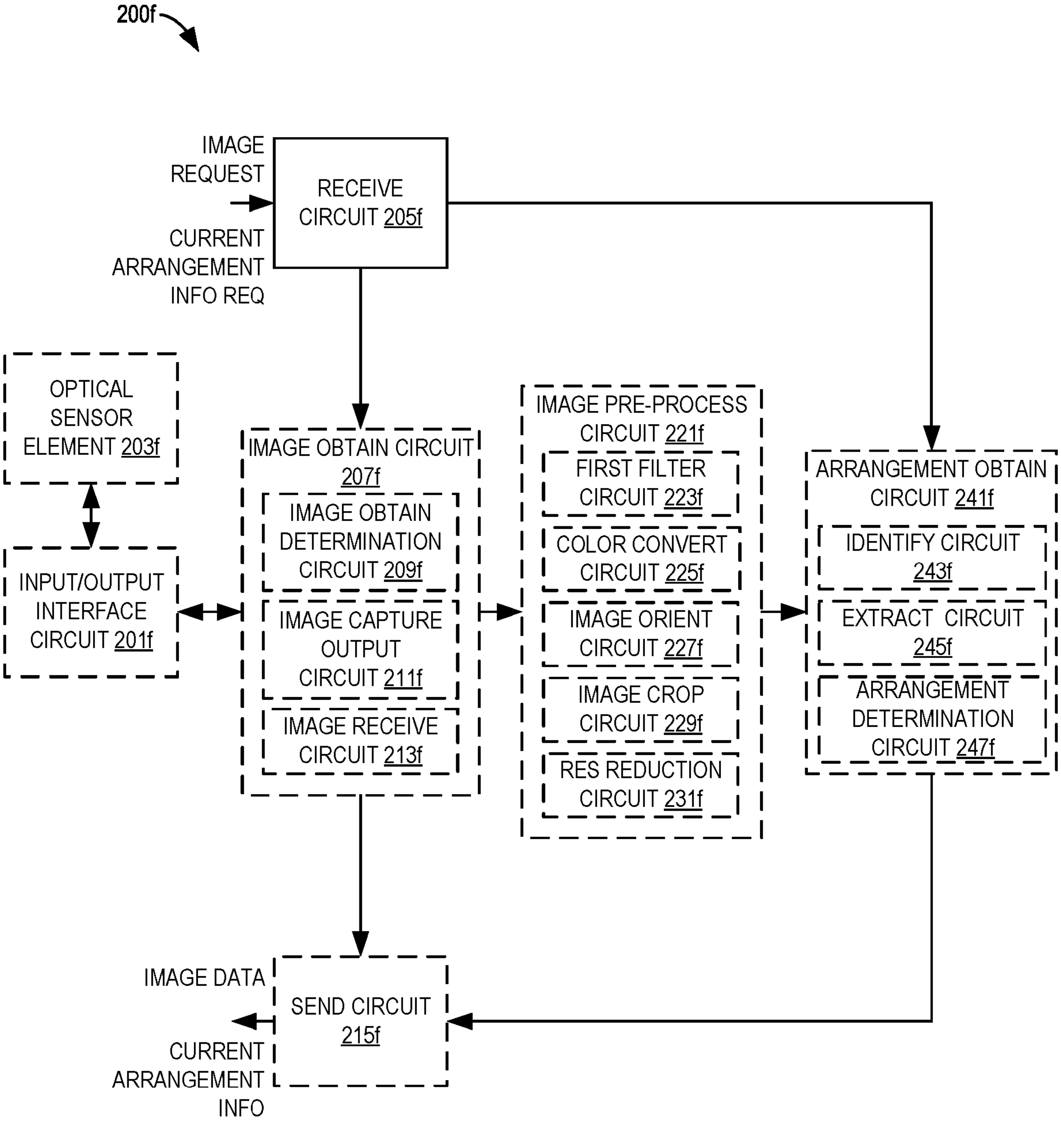
FIG. 2F illustrates one embodiment of an optical sensor device in accordance with various aspects as described herein.

FIG. 2F illustrates another embodiment of an optical sensor device 200*f* in accordance with various aspects as described herein. In FIG. 2F, the device 200*f* implements various functional means, units, or modules (e.g., via the processing circuitry 301*b* in FIG. 3B, via the processing circuitry 501 in FIG. 5, via software code, or the like), or circuits. In one embodiment, these functional means, units, modules, or circuits (e.g., for implementing the method(s) described herein) may include for instance: an input/output interface circuit 201*f* operable to interface to various input and/or output devices such as the optical sensor element 203*f* (e.g., camera); a receive circuit 205*f* operable to receive information; an image obtain circuit 207*f* operable to obtain an image; an image obtain determination circuit 209*f* operable to determine to obtain an image; an image capture output circuit 211*f* operable to output, to the optical sensor element 203*f*, an indication to capture an image; an image receive circuit 213*f* operable to receive, from the optical sensor element 203*f*, image data of a captured image; a send circuit 215*f* operable to send information; an image pre-processing circuit 221*f* operable to pre-process an image based on image data of an image; a first filter circuit 223*f* operable to filter an image based on image data; a color correct or convert circuit 225*f* operable to perform color correction of an image based on image data or to convert a color image to a grayscale image; an image orient circuit 227*f* operable to orient an image based on image data; an image crop circuit 229*f* operable to crop an image based on image data; an image resolution reduction circuit 231*f* operable to reduce a resolution of an image based on image data; an arrangement obtain circuit 241*f* operable to obtain arrangement information of stocked items and corresponding display devices on shelves of a shelf structure based on image data representing a captured image of that shelf structure; a text/object location identifier circuit 243*f* operable to identify presences/locations of text/objects associated with stocked items and corresponding display devices on a shelf structure based on image data of an image; a text/object extract circuit 245*f* operable to extract text/objects associated with stocked items and corresponding display devices based on image data of an image and identified locations of text/objects in that image; and/or a current arrangement determination circuit 247*f* operable to determine arrangement information of stocked items and corresponding display devices on the shelves of a shelf structure based on extracted text/objects of those stocked items and the corresponding display devices in the image and the identified locations of the text/objects in the image.

Figure 3A:
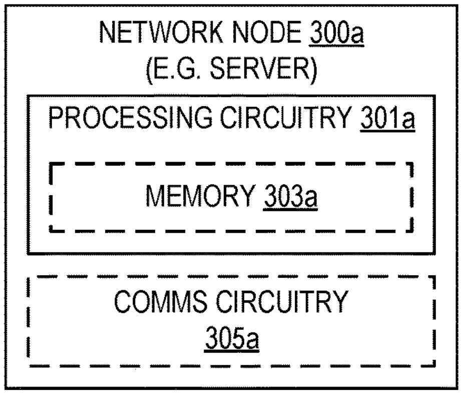
FIG. 3A illustrates another embodiment of a first network node device in accordance with various aspects as described herein.

FIG. 3A illustrates another embodiment of a network node device 300*a* in accordance with various aspects as described herein. In FIG. 3A, the device 300*a* may include processing circuitry 301*a* that is operably coupled to one or more of the following: memory 303*a*, network communications circuitry 305*a*, or the like. The network communication circuitry 305*a* is configured to transmit or receive information to or from one or more other devices via any communication technology. The processing circuitry 301*a* is configured to perform processing described herein, such as by executing instructions stored in memory 303*a*. The processing circuitry 301*a* in this regard may implement certain functional means, units, or modules.

Figure 3B:
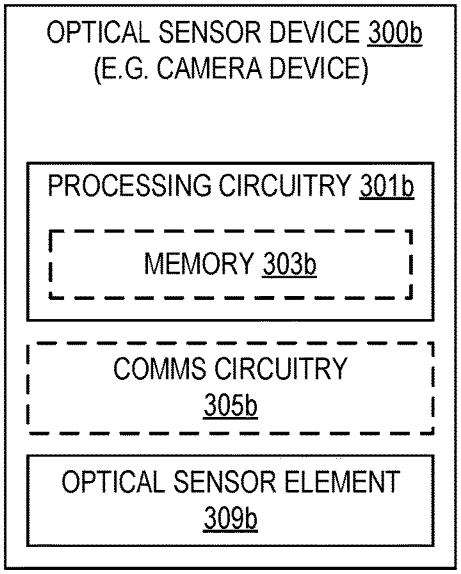
FIG. 3B illustrates another embodiment of an optical sensor device in accordance with various aspects as described herein.

FIG. 3B illustrates another embodiment of an optical sensor device 300*b* in accordance with various aspects as described herein. In FIG. 3B, the device 300*b* may include processing circuitry 301*b* that is operably coupled to one or more of the following: memory 303*b*, network communications circuitry 305*b*, an optical sensor element 309*b* (e.g., scanner, camera), or the like. The network communication circuitry 305*b* is configured to transmit or receive information to or from one or more other devices via any communication technology. The processing circuitry 301*b* is configured to perform processing described herein, such as by executing instructions stored in memory 303*b*. The processing circuitry 301*b* in this regard may implement certain functional means, units, or modules.

Figure 4A:
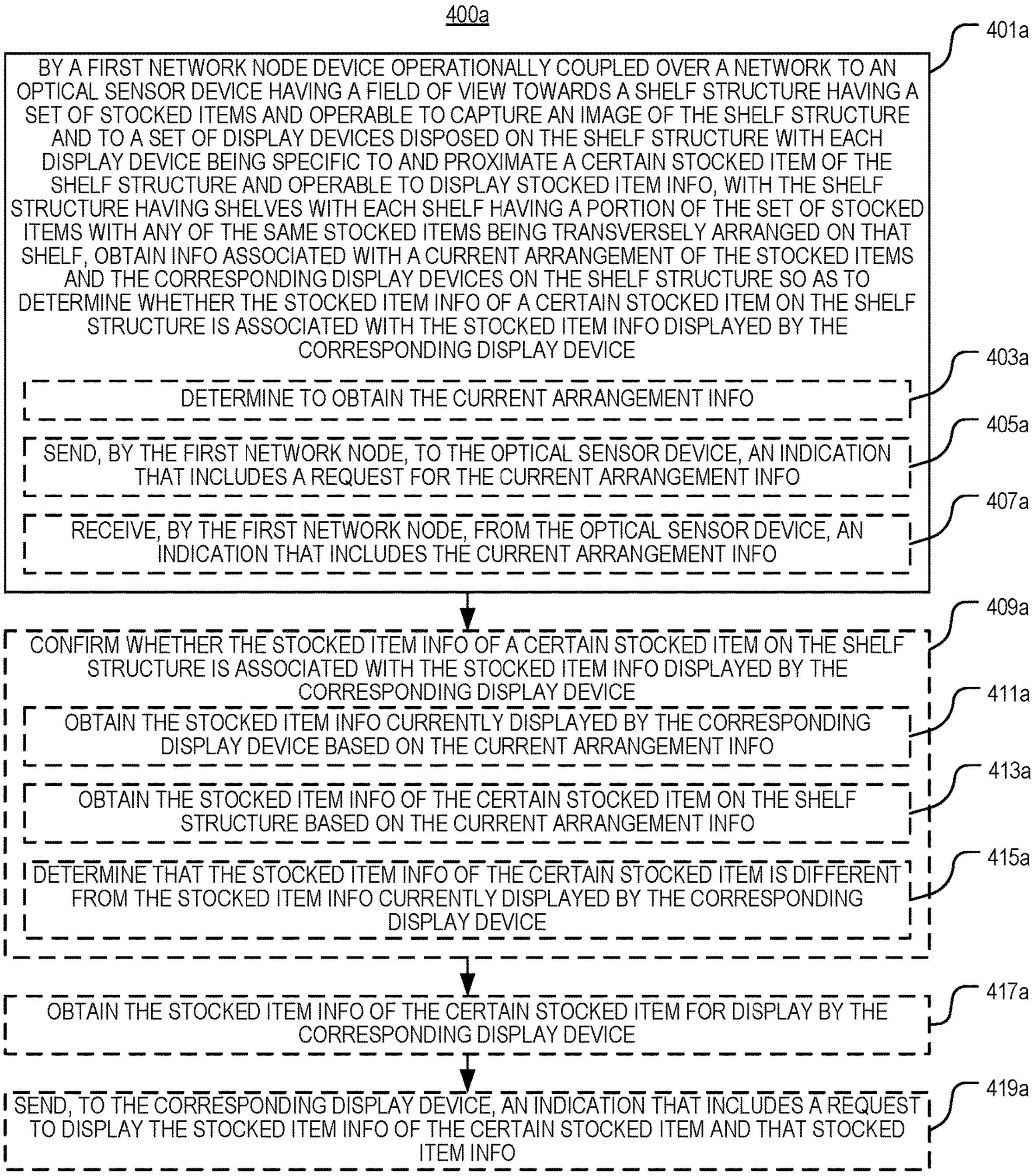
FIGS. 4A-E illustrate embodiments of a method performed by a network node device of automated shelf restocking in accordance with various aspects as described herein.

FIGS. 4A-E illustrate embodiments of a method 400*a-e* performed by a first network node device 121, 200*a-e*, 300*a*, 500 of automated shelf restocking in accordance with various aspects as described herein. In FIG. 4A, the method 400*a* may start, for instance, at block 401*a* where it includes obtaining information associated with a current arrangement of stocked items and corresponding display devices on a shelf structure. At block 403*a*, the method 400*a* may include determining to obtain current arrangement information of the shelf structure. At block 405*a*, the method 400*a* may include sending, by the first network node 121, 200*a-e*, 300*a*, 500, to an optical sensor device over a network, an indication that includes a request for the current arrangement information of the shelf structure. In response, the method 400*a* may include receiving, by the first network node 121, 200*a-e*, 300*a*, 500, from the optical sensor device, an indication that includes the current arrangement information of the shelf structure, as represented by block 407*a*.

In FIG. 4A, the method 400*a* may include confirming whether the stocked item information of a certain stocked item on the shelves off the shelf structure is associated with the stocked item information displayed by the corresponding display device, as represented by block 409*a*. At block 411*a*, the method 400*a* may include obtaining the stocked item information currently displayed by the corresponding display device on the shelf structure based on the current arrangement information of the shelf structure. At block 413*a*, the method 400*a* may include obtaining the stocked item information of the certain stocked item on the shelf structure based on the current arrangement information of the shelf structure. The method 400*a* may then include determining that the stocked item information of the certain stocked item is different from the stocked item information currently displayed by the corresponding display device, as represented by block 415*a*. At block 417*a*, the method 400*a* may include obtaining the stocked item information of the certain stocked item for display by the corresponding display device. At block 419*a*, the method 400*a* may include sending, by the first network node 121, 200*a-e*, 300*a*, 500, to the corresponding display device over the network, an indication that includes a request to display the stocked item information of the certain stocked item.

Figure 4B:
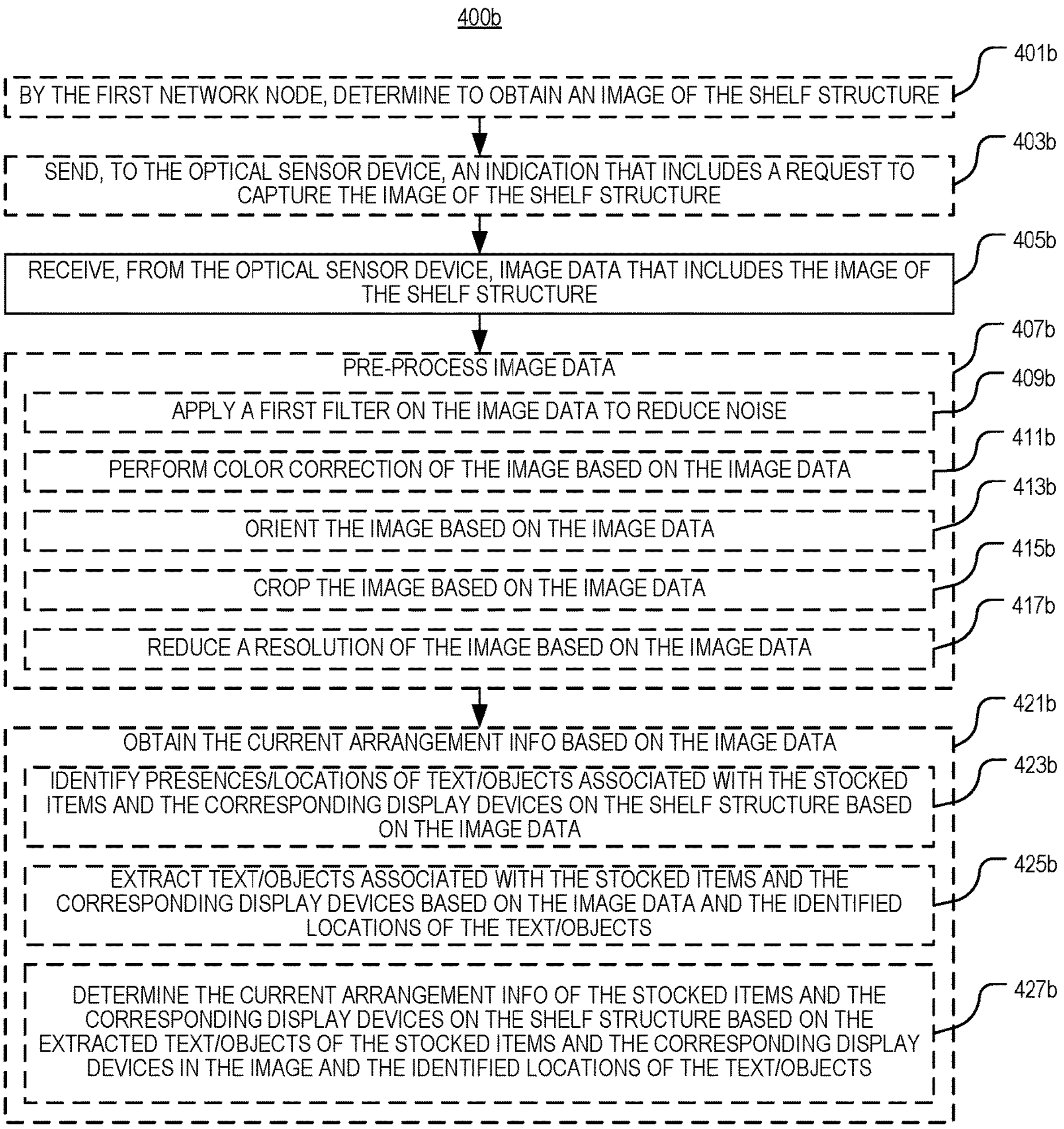

In FIG. 4B, the method 400*b* may start, for instance, at block 401*b* where it may include determining to obtain an image of the shelf structure. At block 403*b*, the method 400*b* may include sending, by the first network node 121, 200*a-e*, 300*a*, 500, to the optical sensor device over the network, an indication that includes a request to capture the image of the shelf structure. In response, the method 400*b* may include receiving, by the first network node 121, 200*a-e*, 300*a*, 500, from the optical sensor device over the network, image data that includes the image of the shelf structure, as represented by block 405*b*. At block 407*b*, the method 400*b* may include pre-processing the image data of the image. At block 409*b*, the method 400*b* may include applying a first filter on the image data such as to reduce noise or artifacts. At block 411*b*, the method 400*b* may include performing color correction of the image based on the image data or converting a color image to a grayscale image based on the image data. At block 413*b*, the method 400*b* may include orienting the image based on the image data. At block 415*b*, the method 400*b* may include cropping the image based on the image data. At block 417*b*, the method 400*b* may include reducing a resolution of the image based on the image data. At block 421*b*, the method 400*b* may include obtaining the current arrangement information of the shelf structure based on the image data. Further, the method 400*b* may include identifying presences/locations of text/objects associated with the stocked items and the corresponding display devices on the shelf structure based on the image data, as represented by block 423*b*. At block 425*b*, the method 400*b* may include extracting text/objects associated with the stocked items and the corresponding display devices on the shelf structure based on the image data and the locations of the stocked items and the corresponding display devices in the image. At block 427*b*, the method 400*b* may include determining the current arrangement information of the stocked items and the corresponding display devices on the shelf structure based on the extracted text/objects of the stocked items and the corresponding display devices and the locations.

Figure 4C:
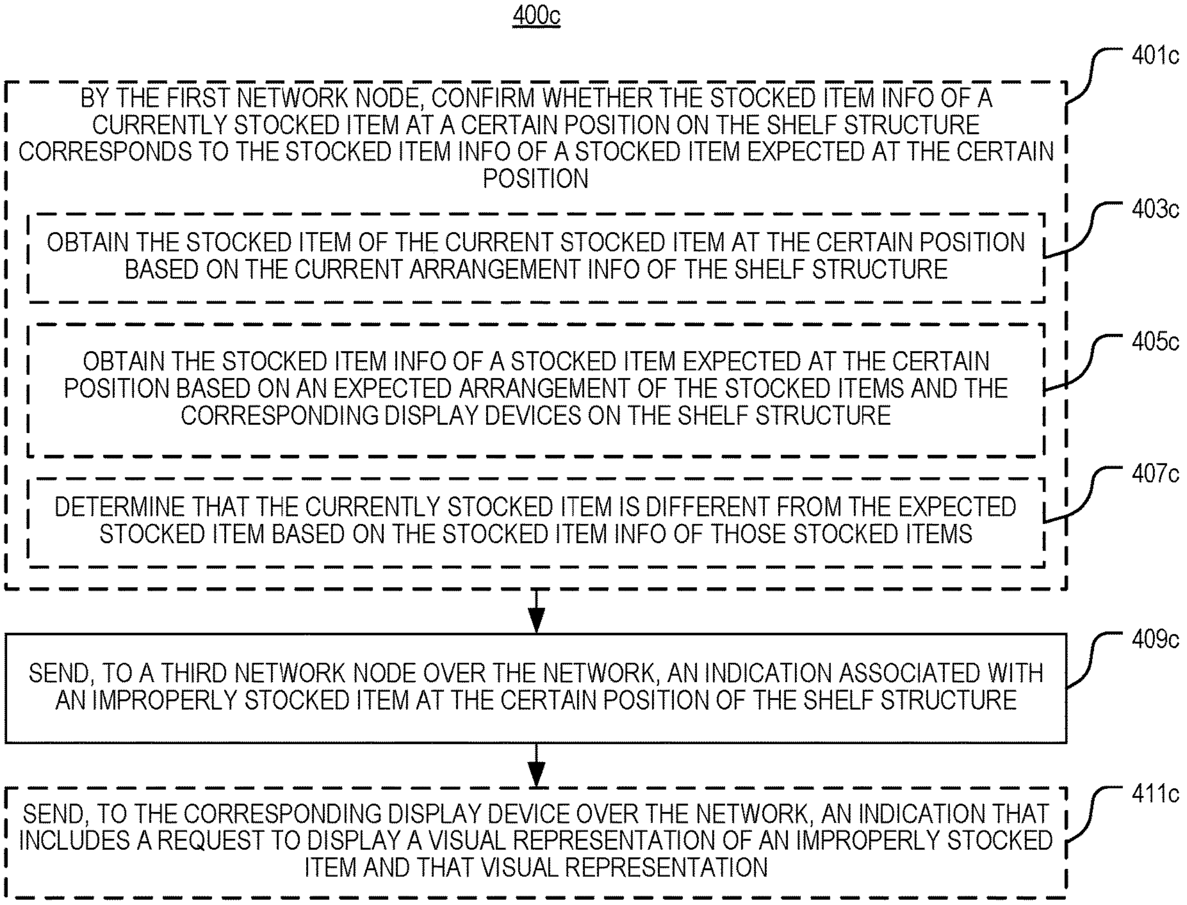

In FIG. 4C, the method 400*c* may start, for instance, at block 401*c* where it may include confirming whether the stocked item information of a currently stocked item at a certain position, location or arrangement on the shelf structure corresponds to the stocked item information of a stocked item expected to be at the certain position, location or arrangement on the shelf structure. At block 403*c*, the method 400*c* may include obtaining the stocked item information of the current stocked item at the certain position, location or arrangement based on the current arrangement information of the shelf structure. At block 405*c*, the method 400*c* may include obtaining the stocked item information of the stocked item expected at the certain position, location or arrangement on the shelf structure based on an expected arrangement of the stocked items and the corresponding display devices on the shelf structure. At block 407*c*, the method 400*c* may include determining that the current stocked item is different from the expected stocked item based on the stocked item information of those stocked items. In response, the method 400*c* includes sending, by the first network node 121, 200*a-e*, 300*a*, 500, to a third network node over the network, an indication associated with an improperly stocked item at the certain position, location or arrangement on the shelf structure, as represented by block 409*c*. At block 411*c*, the method 400*c* may include sending, by the first network node 121, 200*a-e*, 300*a*, 500, to the corresponding display device over the network, an indication that includes a request to display a visual representation of an improperly stocked item.

Figure 4D:
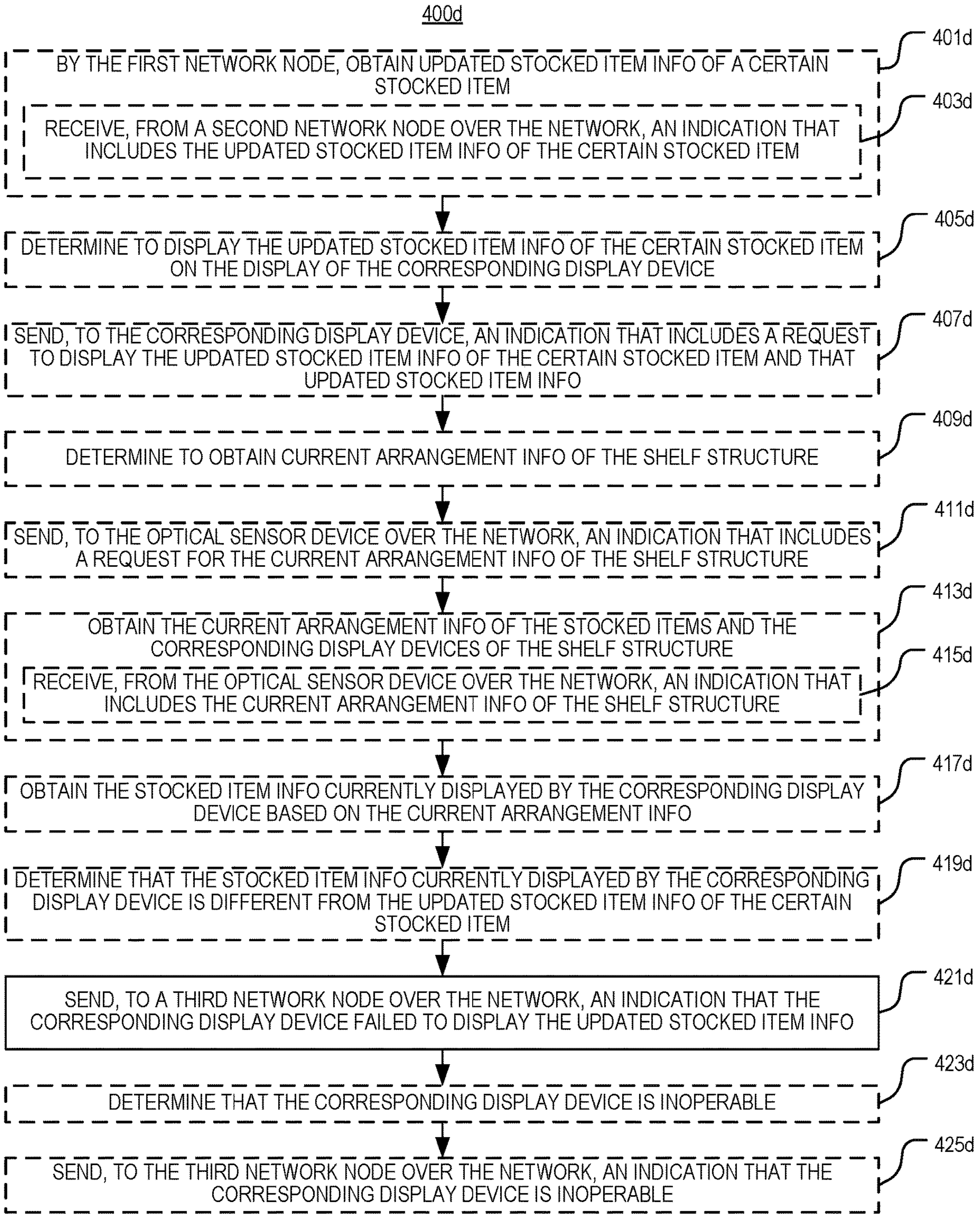

In FIG. 4D, the method 400*d* may start, for instance, at block 401*d* where it may include obtaining updated stocked item information of a certain stocked item. At block 403*d*, the method 400*d* may include receiving, by the first network node 121, 200*a-e*, 300*a*, 500, from a second network node over the network, an indication that includes the updated stocked item information of the certain stocked item. At block 405*d*, the method 400*d* may include determining to display the updated stocked item information of the certain stocked item on the display of the corresponding display device. In response, the method 400*d* may include sending, by the first network node 121, 200*a-e*, 300*a*, 500, to the corresponding display device, an indication that includes a request to display the updated stocked item information of the certain stocked item, as represented by block 407*d*. At block 409*d*, the method 400*d* may include determining to obtain current arrangement information of the shelf structure. In response, the method 400*d* may include sending, to the optical sensor device over the network, an indication that includes a request for the current arrangement information of the shelf structure, as represented by block 411*d*. At block 413*d*, the method 400*d* may include obtaining the current arrangement information of the stocked items and the corresponding display devices on the shelf structure. At block 415*d*, the method 400*d* may include receiving, by the first network node 121, 200*a-e*, 300*a*, 500, from the optical sensor device over the network, an indication that includes the current arrangement information of the shelf structure. At block 417*d*, the method 400*d* may include obtaining the stocked item information currently displayed by the corresponding display device based on the current arrangement information of the shelf structure. At block 419*d*, the method 400*d* may include determining that the stocked item information currently displayed by the corresponding display device is different from the updated stocked item information of the certain stocked item. In response, the method 400*d* includes sending, by the first network node 121, 200*a-e*, 300*a*, 500, to a third network node over the network, an indication that the corresponding display device failed to display the updated stocked item information, as represented by block 421*d*. At block 423*d*, the method 400*d* may include determining that the corresponding display device is inoperable. In response, the method 400*d* may include sending, by the first network node 121, 200*a-e*, 300*a*, 500, to the third network node over the network, an indication that the corresponding display device is inoperable, as represented by block 425*d*.

Figure 4E:
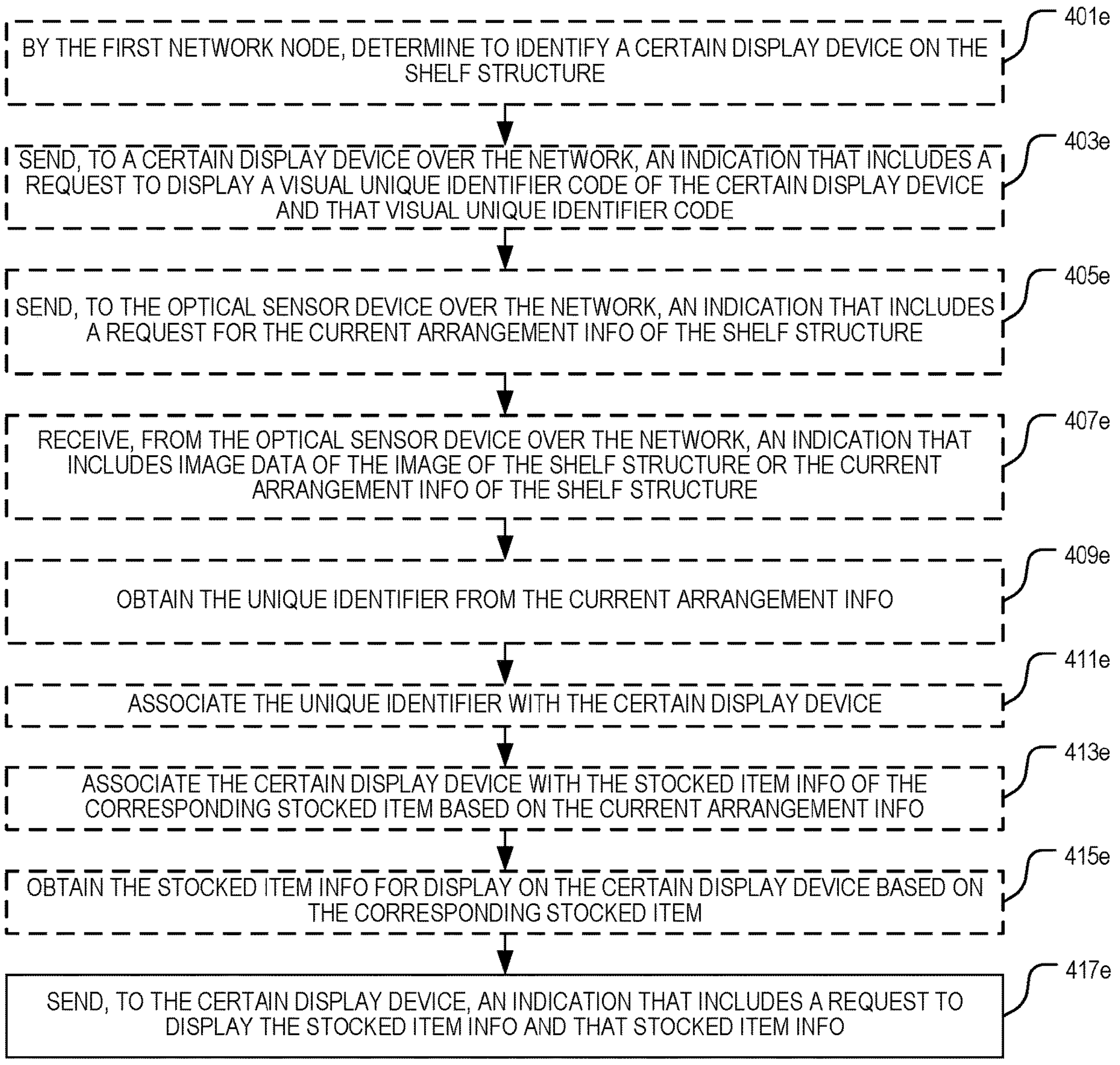

In FIG. 4E, the method 400*e* may start, for instance, at block 401*e* where it may include determining to identify a certain display device on the shelf structure. In response, the method 400*e* may include sending, by the first network node 121, 200*a-e*, 300*a*, 500, to the certain display device over the network, an indication that includes a request to display a visual unique identifier code of the certain display device and that visual unique identifier code, as represented by block 403*e*. At block 405*e*, the method 400*e* may include sending, by the first network node 121, 200*a-e*, 300*a*, 500, to the optical sensor device over the network, an indication that includes a request for the current arrangement information of the shelf structure. Further, the method 400*e* may include receiving, by the first network node 121, 200*a-e*, 300*a*, 500, from the optical sensor device over the network, an indication that includes the current arrangement information of the shelf structure, as represented by block 407*e*. At block 409*e*, the method 400*e* may include obtaining the unique identifier from the current arrangement information of the shelf structure. At block 411*e*, the method 400*e* may include associating the unique identifier with the certain display device. The method 400*e* may also include associating the certain display device with the corresponding stocked item based on the current arrangement information of the shelf structure, as represented by block 413*d*. At block 415*e*, the method 400*e* may include obtaining the stocked item information for display on the certain display device based on the corresponding stocked item. At block 417*e*, the method 400*e* includes sending, by the first network node 121, 200*a-e*, 300*a*, 500, to the certain display device, an indication that includes a request to display the stocked item information and that stocked item information.

Figure 4F:
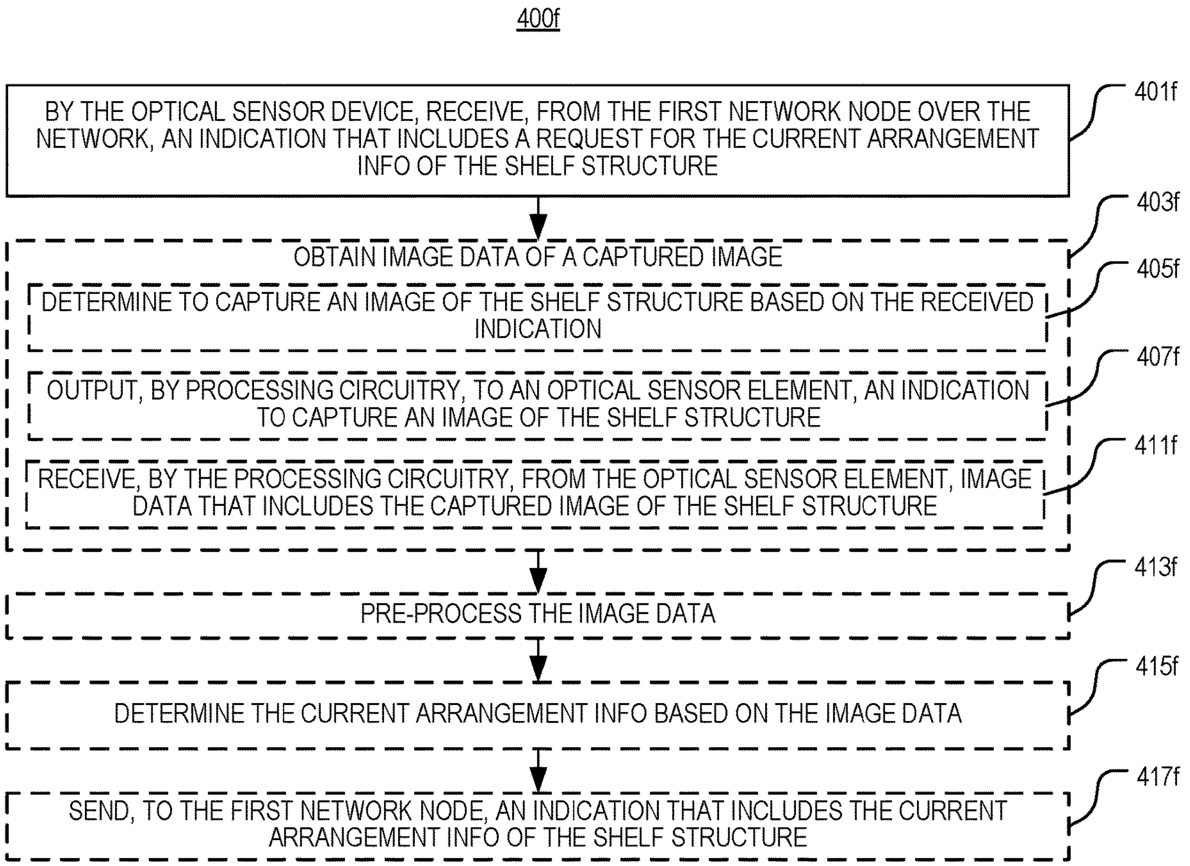
FIG. 4F illustrates one embodiment of a method performed by an optical sensor device of automated shelf restocking in accordance with various aspects as described herein.

FIG. 4F illustrates one embodiment of a method 400*f* performed by an optical sensor device 109*a-d*, 200*f*, 300*b*, 500 of performing automated shelf restocking in accordance with various aspects as described herein. In FIG. 4F, the method 400*f* may start, for instance, at block 401*f* where it includes receiving, from the first network node over the network, an indication that includes a request for the current arrangement information of the shelf structure. In response, the method 400*f* may include obtaining image data of a captured image of the shelf structure, as represented by block 403*f*. At block 403*f*, the method 400*f* may include determining to capture an image of the shelf structure based on the received indication. In response, the method 400*e* may include outputting, by processing circuitry of the optical sensor device, to an optical sensor element of the optical sensor device, an indication to capture an image of the shelf structure, as represented by block 405*f*. In response, the method 400*f* may include receiving, by the processing circuitry, from the optical sensor element, image data that includes the captured image of the shelf structure. At block 413*f*, the method 400*f* may include pre-processing the image data, which may include any of the steps as represented by blocks 409*b*, 411*b*, 413*b*, 415*b*, 417*b*, 419*b* in FIG. 4B. At block 415*f*, the method 400*f* may include determining the current arrangement information based on the image data, which may include any of the steps as represented by blocks 423*b*, 425*b*, 427*b* of FIG. 4B. In response, the method 400*f* may include sending, by the optical sensor device 109*a-d*, 200*f*, 300*b*, 500, to the first network node, an indication that includes the current arrangement information of the shelf structure.

Figure 5:
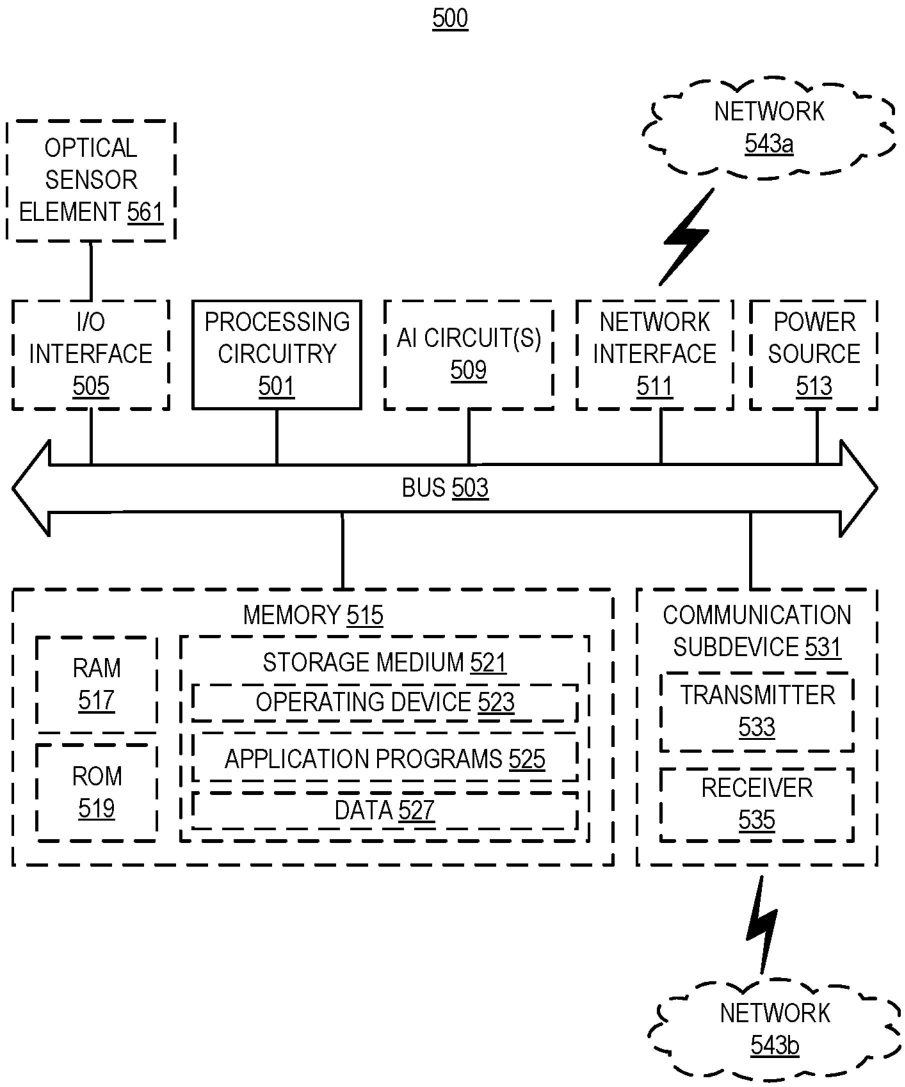
FIG. 5 illustrates another embodiment of a device in accordance with various aspects as described herein.

FIG. 5 illustrates another embodiment of a network node device or an optical sensor device 500 in accordance with various aspects as described herein. In FIG. 5, device 500 includes processing circuitry 501 that is operatively coupled over bus 503 to input/output interface 505, artificial intelligence circuitry 509 (e.g., neural network circuit, machine learning circuit), network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The device 500 may be configured to use an output device via input/output interface 505. An output device 561 may use the same type of interface port as an input device. For example, a USB port or a Bluetooth port may be used to provide input to and output from the device 500. The output device may be a speaker, a sound card, a video card, a display, a monitor, a printer, an actuator, a transducer 575 (e.g., speaker, ultrasound emitter), an emitter, a smartcard, another output device, or any combination thereof. The device 500 may be configured to use an input device via input/output interface 505 to allow a user to capture information into the device 500. The input device may include an optical sensor element 561 such as a scanner device (e.g., optical scanner device), an optical sensor device (e.g., camera), or the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, a microphone, an ultrasound sensor, another like sensor, or any combination thereof. As shown in FIG. 500, the input/output interface 505 can be configured to provide a communication interface to components of the POS system 100 such as the scanner associated with the scanner window 115, the scanner 116, a scale associated with the scan platform 114, the display device 118, touchscreen 118, the payment processing mechanism 122, the printer 124, the coupon slot mechanism 125, the cash acceptor mechanism 126, light emitting devices 130, keyboard, keypad, card reader, the like, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the artificial intelligence circuitry 509 may be configured to learn to perform tasks by considering examples such as performing text/object detection, classification or identification based on image data of an image. In one example, first artificial intelligence circuitry is configured to perform text/object detection or classification. Further, second artificial intelligence circuitry is configured to perform text/object identification (e.g., optical character recognition (OCR)). In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500*a-b*.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a first network node operationally coupled over a network to an optical sensor device having a field of view towards a shelf structure having a set of stocked items and operable to capture an image of the shelf structure. Further, the first network node is operationally coupled to a set of display devices disposed on the shelf structure with each display device being specific to and proximate a certain stocked item of the shelf structure and operable to display stocked item information specific to the certain stocked item. The shelf structure includes shelves with each shelf having a portion of the set of stocked items, with any of the same stocked items being transversely arranged on that shelf. The method includes obtaining information associated with a current arrangement of the stocked items and the corresponding display devices on the shelf structure so as to determine whether the stocked item information of a certain stocked item of the shelf structure is associated with the stocked item information displayed by the corresponding display device.

In another exemplary embodiment, the method can further include receiving, by the first network node, from the optical sensor device over the network, an indication that includes the current arrangement information of the shelf structure.

In another exemplary embodiment, the method can further include receiving, by the first network node, from the optical sensor device over the network, image data that includes an image of the shelf structure and determining the current arrangement information based on that image data.

In another exemplary embodiment, the method can further include pre-processing the image data to perform at least one of noise reduction, contrast enhancement, image resizing, color correction, image segmentation and feature extraction.

In another exemplary embodiment, the current arrangement information determining step can further include sending, by the processing circuitry of the first network node, to artificial intelligence circuitry of the first network node, the image data that includes the image of the shelf structure. Further, the artificial intelligence circuitry can be trained to extract, from image data, information associated with an arrangement of stocked items and corresponding display devices on a shelf structure. The current arrangement information determining step can further include receiving, by the processing circuitry, from the neural network circuitry, an indication that includes the current arrangement information of the shelf structure.

In another exemplary embodiment, the current arrangement information determining step further includes identifying locations of the stocked items and the corresponding display devices on the shelf structure based on the image data; extracting text or objects associated with the stocked items and the corresponding display devices on the shelf structure based on the image data and the identified locations of the stocked items and the corresponding display devices on the shelf structure; and/or determining the information associated with the current arrangement of the stocked items and the corresponding display devices on the shelf structure based on the extracted text or objects associated with the stocked items and the corresponding display devices on the shelf structure and the identified locations of the stocked items and the corresponding display devices on the shelf structure.

In another exemplary embodiment, the method further includes determining that the stocked item information of at least one of the stocked items of the shelf structure is unassociated with the stocked item information currently displayed by the corresponding display device.

In another exemplary embodiment, the stocked item information determining step further includes obtaining the stocked item information of a stocked item currently at a certain position, location or arrangement of the shelf structure based on the current arrangement information of the shelf structure; obtaining the stocked item information of a stocked item expected to be at the certain position, location or arrangement based on expected arrangement information of the shelf structure; and/or determining that the currently stocked item is unassociated with the expected stocked item.

In another exemplary embodiment, the method can further include sending, by the first network node, to the corresponding display device over the network, an indication that includes a request to display a visual representation associated with an improperly stocked item.

In another exemplary embodiment, the method further includes sending, by the first network node, to a third network node over the network, an indication associated with an improperly stocked item at the certain position, location or arrangement of the shelf structure.

In another exemplary embodiment, the method further includes determining that the stocked item information of a stocked item currently on the shelf structure is unassociated with the stocked item information currently displayed by the corresponding display device based on the current arrangement information of the shelf structure.

In another exemplary embodiment, the method further includes obtaining the stocked item information of a stocked item currently of the shelf structure based on the current arrangement information of the shelf structure; obtaining the stocked item information currently displayed by the corresponding display device based on the current arrangement information of the shelf structure; and/or determining that the stocked item information of the stocked item currently of the shelf structure is unassociated with the stocked item information currently displayed by the corresponding display device.

In another exemplary embodiment, the method further includes sending, by the first network node, to a certain display device over the network, an indication that includes a request to display a visual unique identifier code of the certain display device; obtaining the unique identifier of the certain display device based on the current arrangement information of the shelf structure; associating the unique identifier with the certain display device; associating the certain display device with the corresponding stocked item based on the current arrangement information of the shelf structure; obtaining the stocked item information of the corresponding stocked item for display by the certain display device; and/or sending, by the first network node, to the certain display device over the network, an indication that includes a request to display the stocked item information of the corresponding stocked item.

In another exemplary embodiment, the method further includes receiving, by the first network node, from a second network node over the network, an indication that includes updated stocked item information of a certain stocked item; sending, by the first network node, to the corresponding display device over the network, an indication that includes a request to display the updated stocked item information of the certain stocked item; obtaining the current arrangement information of the shelf structure; obtaining the stocked item information currently displayed by the corresponding display device based on the current arrangement information of the shelf structure; determine that the stocked item information currently displayed is different from the updated stocked item information of the certain stocked item; sending, by the first network node, to a third network node over the network, an indication that the corresponding display device failed to display the updated stocked item information of the certain stocked item; determining that the corresponding display device is operable; and/or sending, by the first network node, to the third network node over the network, an indication that the corresponding display device is inoperable.

In one exemplary embodiment, a first network node is operationally coupled over a network to an optical sensor device having a field of view towards a shelf structure having a set of stocked items and operable to capture an image of the shelf structure. The first network node also includes a set of display devices disposed on the shelf structure with each display device being specific to and proximate a certain stocked item of the shelf structure and operable to display stocked item information of the certain stocked item. The shelf structure has shelves with each shelf having a portion of the stocked items with any of the same stocked items being transversely arranged on that shelf. The first network node further includes processing circuitry and a memory with the memory containing instructions executable by the processing circuitry whereby the processing circuitry is configured to obtain information associated with a current arrangement of the stocked items and the corresponding display devices on the shelf structure so as to determine whether the stocked item information of each stocked item of the shelf structure is associated with the stocked item information displayed by the corresponding display device.

In one exemplary embodiment, a system includes an optical sensor device, a set of display devices, and a first network node. The optical sensor device has a field of view towards a shelf structure having a set of stocked items and operable to capture an image of the shelf structure. Further, the shelf structure has shelves with each shelf having a portion of the set of stocked items with any of the same stocked items being transversely arranged on that shelf. The set of display devices is disposed on the shelf structure, with each display device being specific to and proximate a certain stocked item of the shelf structure and operable to display stocked item information specific to the certain stocked item. The first network node is operationally coupled over a network to the optical sensor device and the set of display devices. Further, the first network node has processing circuitry and a memory, with the memory containing instructions executable by the processing circuitry whereby the processing circuitry is configured to obtain information associated with a current arrangement of the stocked items and the corresponding display devices on the shelf structure so as to determine whether the stocked item information of each stocked item of the shelf structure is associated with the stocked item information displayed by the corresponding display device.

In one exemplary embodiment, a method is performed by an optical sensor device operationally coupled to a first network node over a network. Further, the optical sensor device has a field of view towards a shelf structure having a set of stocked items and operable to capture an image of the shelf structure. The shelf structure includes shelves with each shelf having a portion of the set of stocked items, with any of the same stocked items being transversely arranged on that shelf. The shelf structure also includes a set of display devices disposed on the shelf structure with each display device being specific to and proximate a certain stocked item of the shelf structure and operable to display stocked item information specific to the certain stocked item. The method includes receiving, from the first network node over the network, an indication that includes a request for information associated with a current arrangement of the stocked items and the corresponding display devices on the shelf structure so as to enable the first network node to determine whether the stocked item information of a certain stocked item on that shelf structure is associated with the stocked item information displayed by the corresponding display device.

In one exemplary embodiment, an optical sensor device is operationally coupled over a network to a first network node. Further, the optical sensor device has a field of view towards a shelf structure having a set of stocked items and operable to capture an image of the shelf structure. The shelf structure includes shelves with each shelf having a portion of the set of stocked items, with any of the same stocked items being transversely arranged on that shelf. The shelf structure also has a set of display devices disposed on the shelf structure, with each display device being specific to and proximate a certain stocked item of the shelf structure and operable to display stocked item information specific to the certain stocked item. The optical sensor device further includes processing circuitry and a memory with the memory containing instructions executable by the processing circuitry whereby the processing circuitry is configured to receive, from the first network node over the network, an indication that includes a request for information associated with a current arrangement of the stocked items and the corresponding display devices on the shelf structure so as to enable the first network node to determine whether the stocked item information of a certain stocked item on that shelf structure is associated with the stocked item information displayed by the corresponding display device.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein.

Alternatively or additionally, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

by a first network node device operationally coupled over a network to an optical sensor device having a field of view towards a shelf structure having a set of stocked items and operable to capture an image of the shelf structure and to a set of display devices disposed on the shelf structure with each display device being specific to and proximate a certain stocked item of the shelf structure and operable to display stocked item information of the certain stocked item, with the shelf structure having shelves with each shelf having a portion of the set of stocked items with any of the same stocked items being transversely arranged on that shelf, obtaining information associated with a current arrangement of the stocked items and the corresponding display devices on the shelf structure so as to determine whether the stocked item information of a certain stocked item on the shelf structure is associated with the stocked item information displayed by the corresponding display device, wherein the obtaining step includes:

receiving, by the first network node device, from the optical sensor device over the network, image data that includes an image of the shelf structure;

pre-processing the image data to perform at least one of noise reduction, contrast enhancement, image resizing, color correction, image segmentation and feature extraction; and determining the current arrangement information of the shelf structure based on the image data.

2. The method of claim 1, further comprising:

receiving, by the first network node device, from the optical sensor device over the network, an indication that includes the current arrangement information of the shelf structure.

3. The method of claim 1, wherein the current arrangement information determining step further includes:

sending, by processing circuitry of the first network node device, to artificial intelligence circuitry of the first network node device, the image data that includes the image of the shelf structure, wherein the artificial intelligence circuitry is trained on and operable to extract, from image data, information associated with an arrangement of stocked items and corresponding display devices on a shelf structure; and receiving, by the processing circuitry, from the artificial intelligence circuitry, an indication that includes the current arrangement information of the shelf structure.

4. The method of claim 1, wherein the current arrangement information determining step further includes:

identifying presences and locations of text or objects associated with the stocked items and the corresponding display devices on the shelf structure based on the image data;

extracting the text or objects associated with the stocked items and the corresponding display devices on the shelf structure based on the image data and the identified locations of the text or objects; and determining the current arrangement information of the stocked items and the corresponding display devices on the shelf structure based on the extracted text or objects associated with the stocked items and the corresponding display devices on the shelf structure and the identified locations of the text or objects.

5. The method of claim 1, further comprising:

determining that the stocked item information of at least one of the stocked items of the shelf structure is different from the stocked item information currently displayed by the corresponding display device based on the current arrangement information of the shelf structure.

6. The method of claim 5, wherein the stocked item information determining step further includes:

obtaining the stocked item information of a stocked item currently at a certain position, location or arrangement of the shelf structure based on the current arrangement information of the shelf structure;

obtaining the stocked item information of a stocked item expected to be at the certain position, location or arrangement based on expected arrangement information of the shelf structure; and determining that the currently stocked item is different from the expected stocked item.

7. The method of claim 6, further comprising:

sending, by the first network node device, to the corresponding display device over the network, an indication that includes a request to display a visual representation associated with an improperly stocked item.

8. The method of claim 6, further comprising:

sending, by the first network node device, to a third network node device over the network, an indication associated with an improperly stocked item at the certain position, location or arrangement of the shelf structure.

9. The method of claim 1, further comprising:

receiving, by the first network node device, from a second network node device over the network, an indication that includes updated stocked item information of a certain stocked item;

sending, by the first network node device, to the corresponding display device over the network, an indication that includes a request to display the updated stocked item information of the certain stocked item;

obtaining the current arrangement information of the shelf structure;

obtaining the stocked item information currently displayed by the corresponding display device based on the current arrangement information of the shelf structure;

determining that the stocked item information currently displayed is different from the updated stocked item information of the certain stocked item; and sending, by the first network node device, to a third network node device over the network, an indication that the corresponding display device failed to display the updated stocked item information of the certain stocked item.

10. The method of claim 9, further comprising:

determining that the corresponding display device is inoperable; and sending, by the first network node device, to the third network node device over the network, an indication that the corresponding display device is inoperable.

11. The method of claim 1, further comprising:

sending, by the first network node device, to a certain display device over the network, an indication that includes a request to display a visual unique identifier code of the certain display device;

obtaining the unique identifier of the certain display device based on the current arrangement information of the shelf structure;

associating the unique identifier with the certain display device;

associating the certain display device with the corresponding stocked item based on the current arrangement information of the shelf structure;

obtaining the stocked item information of the corresponding stocked item for display by the certain display device; and sending, by the first network node device, to the certain display device over the network, an indication that includes a request to display the stocked item information of the corresponding stocked item.

12. A first network node device, comprising:

processing circuitry; and a memory containing instructions executable by the processing circuitry;

wherein the first network node device is operationally coupled over a network to an optical sensor device having a field of view towards a shelf structure having a set of stocked items and operable to capture an image of the shelf structure and to a set of display devices disposed on the shelf structure with each display device being specific to and proximate a certain stocked item on the shelf structure and operable to display stocked item information of the certain stocked item, with the shelf structure having shelves with each shelf having a portion of the stocked items with any of the same stocked items being transversely arranged on that shelf; and wherein the memory contains instructions executable by the processing circuitry whereby the processing circuitry is configured to:

obtain information associated with a current arrangement of the stocked items and the corresponding display devices on the shelf structure so as to determine whether the stocked item information of a certain stocked item on the shelf structure is associated with the stocked item information displayed by the corresponding display device, wherein to obtain the current arrangement information, the processing circuitry is configured to:

receive, from the optical sensor device over the network, image data that includes an image of the shelf structure;

pre-process the image data to perform at least one of noise reduction, contrast enhancement, image resizing, color correction, image segmentation and feature extraction; and determine the current arrangement information of the shelf structure based on the image data.

13. The device of claim 12, wherein the memory includes further instructions executable by the processing circuitry whereby the processing circuitry is configured to:

identify presences and locations of text or objects associated with the stocked items and the corresponding display devices on the shelf structure based on the image data;

extract the text or objects associated with the stocked items and the corresponding display devices on the shelf structure based on the image data and the identified locations of the text or objects; and determine the current arrangement information of the stocked items and the corresponding display devices on the shelf structure based on the extracted text or objects associated with the stocked items and the corresponding display devices on the shelf structure and the identified locations of the text or objects.

14. The device of claim 12, wherein the memory includes further instructions executable by the processing circuitry whereby the processing circuitry is configured to:

determine that the stocked item information of a stocked item currently on the shelf structure is different from the stocked item information currently displayed by the corresponding display device based on the current arrangement information of the shelf structure.

15. The device of claim 14, wherein the memory includes further instructions executable by the processing circuitry whereby the processing circuitry is configured to:

receive, from a second network node device over the network, an indication that includes updated stocked item information of a certain stocked item;

send, to the corresponding display device over the network, an indication that includes a request to display the updated stocked item information of the certain stocked item;

obtain the current arrangement information of the shelf structure;

obtain the stocked item information currently displayed by the corresponding display device based on the current arrangement information of the shelf structure;

determine that the stocked item information currently displayed is different from the updated stocked item information of the certain stocked item; and send, to a third network node device over the network, an indication that the corresponding display device failed to display the updated stocked item information of the certain stocked item.

16. The device of claim 15, wherein the memory includes further instructions executable by the processing circuitry whereby the processing circuitry is configured to:

send, to a certain display device over the network, an indication that includes a request to display a visual unique identifier code of the certain display device;

obtain the unique identifier of the certain display device based on the current arrangement information;

associate the unique identifier with the certain display device;

associate the certain display device with the corresponding stocked item based on the current arrangement information;

obtain the stocked item information for display on the certain display device based on the corresponding stocked item; and send, to the certain display device over the network, an indication that includes the stocked item information for display on the certain display device.

17. A system, comprising:

an optical sensor device having a field of view towards a shelf structure having a set of stocked items and operable to capture an image of the shelf structure, with the shelf structure having shelves with each shelf having a portion of the set of stocked items with any of the same stocked items being transversely arranged on that shelf;

a set of display devices disposed on the shelf structure with each display device being specific to and proximate a certain stocked item of the shelf structure and operable to display stocked item information specific to the certain stocked item; and a first network node device operationally coupled over a network to the optical sensor device and the set of display devices, with the first network node device having processing circuitry and a memory, the memory containing instructions executable by the processing circuitry whereby the processing circuitry is configured to:

obtain information associated with a current arrangement of the stocked items and the corresponding display devices on the shelf structure so as to determine whether the stocked item information of a certain stocked item on the shelf structure is associated with the stocked item information displayed by the corresponding display device, wherein to obtain the current arrangement information, the processing circuitry is configured to:

receive, from the optical sensor device over the network, image data that includes an image of the shelf structure;

pre-process the image data to perform at least one of noise reduction, contrast enhancement, image resizing, color correction, image segmentation and feature extraction; and determine the current arrangement information of the shelf structure based on the image data.

* * * * *